United States Patent
Lu

(10) Patent No.: US 11,877,207 B2
(45) Date of Patent: *Jan. 16, 2024

(54) ESTIMATING THE LOCATION OF A REFERENCE RADIO AND USING THE ESTIMATED LOCATION OF THE REFERENCE RADIO TO ESTIMATE THE LOCATION OF A WIRELESS TERMINAL

(71) Applicant: Polaris Wireless, Inc., Mountain View, CA (US)

(72) Inventor: Jonathan Shiao-en Lu, Cupertino, CA (US)

(73) Assignee: Polaris Wireless, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,039

(22) Filed: Jul. 26, 2020

(65) Prior Publication Data

US 2021/0029663 A1    Jan. 28, 2021

Related U.S. Application Data

(60) Provisional application No. 62/885,343, filed on Aug. 12, 2019, provisional application No. 62/879,527, filed on Jul. 28, 2019.

(51) Int. Cl.
*H04W 4/029* (2018.01)
*H04W 24/10* (2009.01)
(Continued)

(52) U.S. Cl.
CPC ............ *H04W 4/029* (2018.02); *G01S 5/012* (2020.05); *G01S 5/0284* (2013.01);
(Continued)

(58) Field of Classification Search
None
See application file for complete search history.

(56) References Cited

U.S. PATENT DOCUMENTS 5,390,339 A * 2/1995 Bruckert ................... G01S 5/02
                                                      342/457
5,574,466 A * 11/1996 Reed ........................ G01S 3/00
                                                      342/359

(Continued)

OTHER PUBLICATIONS

S. Fernandez, "X-Ray Eyes in the Sky—UCSB researchers have a proposed a new method for 3D through-wall imaging that utilizes drones and WiFi," The UC Santa Barbara Current, Jun. 19, 2017.

(Continued)

*Primary Examiner* — Adolf Dsouza
(74) *Attorney, Agent, or Firm* — McGeary Cukor LLC; Jason Paul DeMont; Kenneth Ottesen

(57) ABSTRACT

A location engine uses the empirical measurements made by a scouting wireless terminal (i) to discover the existence of a reference radio within a geographic region; (ii) to generate an estimate of the location of the newly-discovered reference radio, and (iii) to generate an estimate of the transmission power of the downlink control channel radio signal transmitted by the newly-discovered reference radio. The location engine then uses: (i) the estimate of the location of the newly-discovered reference radio, and (ii) the estimate of the transmission power of the downlink control channel radio signal transmitted by the newly-discovered reference radio, and (iii) measurements, made by a user wireless terminal, of the power of each of the downlink control channel radio signals transmitted by each of the reference radios to generate an estimate of the location of the user wireless terminal.

27 Claims, 10 Drawing Sheets

(51) Int. Cl.
*G01S 5/02* (2010.01)
*H04B 17/318* (2015.01)
*H04W 52/24* (2009.01)
*H04W 64/00* (2009.01)
*G01S 11/06* (2006.01)
*G01S 5/00* (2006.01)
*H04W 4/02* (2018.01)
*H04W 48/16* (2009.01)

(52) U.S. Cl.
CPC .......... *G01S 5/02521* (2020.05); *G01S 11/06* (2013.01); *H04B 17/318* (2015.01); *H04W 4/023* (2013.01); *H04W 24/10* (2013.01); *H04W 48/16* (2013.01); *H04W 52/242* (2013.01); *H04W 64/003* (2013.01)

(56) References Cited

U.S. PATENT DOCUMENTS

| | | | |
|---|---|---|---|
| 6,097,336 | A | 8/2000 | Stilp |
| 6,236,365 | B1 | 5/2001 | LeBlanc et al. |
| 7,116,987 | B2 * | 10/2006 | Spain, Jr. .............. G01S 5/0252 455/456.1 |
| 8,712,428 | B2 * | 4/2014 | Spain .................... H04W 64/00 455/456.1 |
| 9,078,229 | B1 | 7/2015 | Vannucci et al. |
| 2001/0022558 | A1 | 9/2001 | Karr, Jr. et al. |
| 2002/0039904 | A1 | 4/2002 | Anderson |
| 2002/0186167 | A1 | 12/2002 | Anderson |
| 2003/0017832 | A1 | 1/2003 | Anderson et al. |
| 2003/0222819 | A1 | 12/2003 | Karr et al. |
| 2005/0179591 | A1 | 8/2005 | Bertoni et al. |
| 2006/0025158 | A1 | 2/2006 | Leblanc et al. |
| 2008/0113672 | A1 | 5/2008 | Karr et al. |
| 2010/0207820 | A1 | 8/2010 | Kawano et al. |
| 2011/0221635 | A1 | 9/2011 | Wang |
| 2011/0287778 | A1 | 11/2011 | Levin et al. |
| 2011/0287784 | A1 | 11/2011 | Levin et al. |
| 2011/0287801 | A1 | 11/2011 | Levin et al. |
| 2013/0260782 | A1 * | 10/2013 | Un ...................... H04W 64/003 455/456.1 |
| 2015/0029869 | A1 | 1/2015 | Wolcott et al. |
| 2016/0037305 | A1 | 2/2016 | Pan et al. |

OTHER PUBLICATIONS

Rodriguez Larrad, I., Nguyen, H. C., Kovács, I. Z., Sørensen, T. B., & Mogensen, P. E. (2017). An Empirical Outdoor-to-Indoor Path Loss Model from below 6 GHz to cm-Wave Frequency Bands. I E E E Antennas and Wireless Propagation Letters, 16, 1329-1332. https://doi.org/10.1109/LAWP.2016.2633787.

Robert Wilson, "Propagation Losses Through Common Building Materials, 2.4 GHz v 5 GHz," Magis Networks, Inc., E10589, Aug. 2002.

USPTO, Office Action, U.S. Appl. No. 16/939,044, dated Nov. 23, 2021.

USPTO, Office Action, U.S. Appl. No. 16/939,040, dated Jul. 7, 2021.

USPTO, Office Action, U.S. Appl. No. 16/939,041, dated May 26, 2021.

USPTO, Office Action, U.S. Appl. No. 16/939,042, dated Jun. 9, 2021.

USPTO, Office Action, U.S. Appl. No. 16/939,040, dated Oct. 18, 2021.

USPTO, Office Action, U.S. Appl. No. 16/939,041, dated Dec. 21, 2021.

USPTO, Office Action, U.S. Appl. No. 16/939,042, dated Dec. 21, 2021.

USPTO, Decision on Appeal, U.S. Appl. No. 16/939,039, dated Aug. 14, 2023.

USPTO, Decision on Appeal, U.S. Appl. No. 16/939,041, dated Aug. 14, 2023.

USPTO, Decision on Appeal, U.S. Appl. No. 16/939,042, dated Aug. 14, 2023.

USPTO, Notice of Allowance, U.S. Appl. No. 16/939,040, dated Mar. 9, 2022.

USPTO, Notice of Allowance, U.S. Appl. No. 16/939,043, dated Mar. 9, 2022.

USPTO, Notice of Allowance, U.S. Appl. No. 16/939,044, dated Mar. 9, 2022.

USPTO, Notice of Allowance, U.S. Appl. No. 16/939,041, dated Sep. 27, 2023.

USPTO, Notice of Allowance, U.S. Appl. No. 16/939,042, dated Sep. 27, 2023.

* cited by examiner

ESTIMATING THE LOCATION OF A REFERENCE RADIO AND USING THE ESTIMATED LOCATION OF THE REFERENCE RADIO TO ESTIMATE THE LOCATION OF A WIRELESS TERMINAL

CROSS-REFERENCE TO RELATED APPLICATIONS

This application claims the benefit of:
(i) U.S. Patent Application 62/879,527, entitled "Estimating the Location of a Reference Radio in a Geographic Region and Using the Estimated Location of the Reference Radio to Estimate the Location of a Wireless Terminal," filed on Jul. 28, 2019, which is incorporated by reference; and
(ii) U.S. Patent Application 62/885,343, entitled "Estimating the Location of a Reference Radio in a Geographic Region and Using the Estimated Location of the Reference Radio to Estimate the Location of a Wireless Terminal," filed on Aug. 12, 2019, which is incorporated by reference.

This application is related to:
(i) U.S. patent application Ser. No. 16/939,040, entitled "Estimating the Excess Path Loss Inside of a Building and Using the Estimates of Excess Path Loss to Estimate the Location of a Wireless Terminal", filed on Jul. 26, 2020, which is incorporated by reference; and
(ii) U.S. patent application Ser. No. 16/939,041, entitled "Estimating the Location of a Footprint of Building and Using the Footprint to Estimate the Location of a Wireless Terminal", filed on Jul. 26, 2020, which is incorporated by reference; and
(iii) U.S. patent application Ser. No. 16/939,042, entitled "Estimating the Location of a Reference Radio Based on the Signals Transmitted by a Multi-Band Radio Transmitter", filed on Jul. 26, 2020, which is incorporated by reference; and
(iv) U.S. patent application Ser. No. 16/939,043, entitled "Integrated Estimation of the Location of a Plurality of Reference Radios", filed on Jul. 26, 2020, which is incorporated by reference; and
(v) U.S. patent application Ser. No. 16/939,044, entitled "Estimating the Location of a Reference Radio in a Multi-Story Building and Using the Estimated Location of the Reference Radio to Estimate the Location of a Wireless Terminal", filed on Jul. 26, 2020, which is incorporated by reference.

If there is any inconsistency between the language in one or more of these applications and this specification, the language in this specification prevails for the purposes of interpreting this specification.

FIELD OF THE INVENTION

The present invention relates to telecommunications in general and, more particularly, to a method of using radio signals to generate an estimate of the location of a wireless terminal.

BACKGROUND OF THE INVENTION

Wireless telecommunications (e.g., cellular, WiFi, Bluetooth, etc.) are a staple for the communication of voice, text, video, and multimedia. The salient advantage of wireless telecommunications over wireline telecommunications is that wireless telecommunications affords mobility to the user. On the other hand, the mobility is a double-edge sword in that it is a disadvantage to any entity that has a legitimate interest in being able to quickly and accurately ascertain the location of the wireless terminal or its user.

Such interested entities can include:
(i) the wireless terminal itself, or
(ii) the user of the wireless terminal, or
(iii) a remote person, remote terminal, or a remote data processing system.

There are a variety of reasons why the wireless terminal itself might be interested in knowing its own location. For example, the wireless terminal might comprise a navigation application that provides its user with driving directions. If the wireless terminal was not able to ascertain its own location, it could not know how to navigate to another location.

There are a variety of reasons why the user of the wireless terminal might be interested in knowing his or her own location. For example, the user might want to record the latitude and longitude of his or her location for future reference. Or the user might want to tell a friend where he or she is.

And finally, there are a variety of reasons why a remote entity, a remote terminal, or a remote data processing system might be interested in knowing the location of the wireless terminal (and/or its associated user). For example, the police who receive a 9-1-1 emergency call are interested in knowing the location of the wireless terminal so that they can dispatch first responders to the scene.

The hardware and software that generates an estimate of the location of a wireless terminal is known as a "location engine." The hardware and software composing the location engine can reside:
(i) entirely within the wireless terminal, or
(ii) entirely outside the wireless terminal in a remote terminal, server, or data processing system, or
(iii) partially within the wireless terminal and partially within one or more remote terminals, one or more servers, or data processing systems.

An automobile GPS receiver is a well-known example of a wireless terminal whose location engine resides entirely within the wireless terminal.

As a radio signal propagates through space, some traits of the signal are the same at each point in space (e.g., the frequency of the radio signal, etc.). These are the location-independent traits of a radio signal. In contrast, some traits of the radio signal do vary at each point in space (e.g., the signal strength of the radio signal, the delay spread of the radio signal, etc.). These are the location-dependent traits of the signal. Typically, the location-dependent traits of a signal vary, for example, based on:
(i) the distance from the transmitter to the point, and
(ii) the direction from the transmitter to the point (with respect to the transmitter's antenna pattern), and
(iii) the radio-frequency environment in the regions of space in the vicinity of the point, the transmitter, and the path from the transmitter to the point.

There are four general techniques in the prior art for estimating the location of a wireless terminal based on the measurement of one or more location-dependent traits of one or more reference radio signals that are transmitted between the wireless terminal and one or more reference radios. The four techniques are:
(i) radio-signal identification,
(ii) radio-signal direction finding,
(iii) radio-signal range finding, and
(iv) radio-signal pattern matching.

Each will be described in turn.

Radio-Signal Identification—

As a matter of physics, the locally-averaged signal strength (hereinafter "power") of a radio signal decreases as the distance from the transmitter increases. When the radio-frequency environment is free of radio-frequency obstacles, the decrease is smooth. In contrast, when the radio-frequency environment comprises radio-frequency obstacles, the power generally—but not always—decreases as the distance from the transmitter increases. In either case, if a radio signal is transmitted at a first power and is received at or above a second power, then it can be logically deduced that the transmitter is within a fixed distance of the receiver. This technique, and variations on it, are sometimes colloquially called "cell ID," "ECID," and "enhanced cell ID."

Radio-signal identification can be used to estimate the location of a cell phone at an unknown location in, for example, the following manner. A downlink radio signal at a first power is transmitted from a cell tower (i.e., a reference radio), which is at a known location. If the cell phone (i.e., the wireless terminal) can receive the downlink signal at or above a second power, then it can be logically deduced that the cell phone is within a fixed distance of the cell tower.

Conversely, if an uplink radio signal at a first power is transmitted by a cell phone at an unknown location and received by a cell tower at a known location at or above a second power, then it can also be logically deduced that the cell phone is within a fixed distance of the cell tower.

Radio-signal identification can also be used to estimate the location of a WiFi-enabled device at an unknown location in, for example, the following manner. A downlink radio signal at a first power is transmitted by a WiFi Access Point (i.e., a reference radio), which is at a known location. If a WiFi-enabled device (i.e., the wireless terminal) can receive the downlink signal at or above a second power, then it can be logically deduced that the WiFi-enabled device is within a fixed distance of the WiFi Access Point. This is one technique that Apple and Google use to locate devices—such as notebook computers and iPads—that do not comprise GPS receivers or cellular radios.

Conversely, if an uplink radio signal is transmitted by a WiFi-enabled device at an unknown location and received by a WiFi Access Point at a known location, then it can be logically deduced that the that the WiFi-enabled device is within a fixed distance of the WiFi Access Point.

There are numerous tricks that can be made to the basic radio-signal identification to improve the accuracy of the estimate for the location, and numerous companies like Ericsson, Qualcomm, Apple, and Google each tout their own flavor. The principal advantage of radio-signal identification is that it is computationally simple. The principal disadvantage of radio-signal identification is that its results are insufficiently accurate for many applications.

Radio-Signal Direction Finding—

Radio signals propagate in a vacuum in a straight line in the absence gravitational effects. This observation can be used to estimate the location of a cell phone at an unknown location in, for example, the following manner. If the cell phone (i.e., the wireless terminal) transmits an uplink radio signal and two or more cell towers (i.e., reference radios) can determine the direction from which the uplink signal arrives, then the location of the cell phone can be estimated using triangulation.

Conversely, if the three or more cell towers (i.e., reference radios) at known locations each transmit a downlink radio signal and the cell phone can determine the direction from which each downlink signal arrives, then the location of the cell phone can be estimated using triangulation.

Radio-signal direction finding can also be used in an analogous manner to estimate the location of a WiFi-enabled device at an unknown location, but radio-signal direction finding is not often used to locate WiFi-enabled devices because real-world radio-frequency environments are usually full of radio-frequency obstacles that render the technique insufficiently accurate for many applications.

Radio-Signal Range Finding—

The speed with which radio signals propagate is well known in the prior art. This observation can be used to estimate the location of a cell phone at an unknown location in, for example, the following manner. If three or more cell towers (i.e., reference radios) at known locations each transmit a downlink radio signal to the cell phone (i.e., the wireless terminal) and the cell phone can determine how long it took for each downlink signal to reach the cell phone—and thus the distance or range of the cell phone from each cell tower—then the location of the cell phone can be estimated using trilateration.

Conversely, if the cell phone transmits an uplink signal to three or more cell towers and the cell towers can determine how long it took for the uplink signal to reach the towers, then the location of the cell phone can be estimated using trilateration.

Radio-signal range finding can also be used in an analogous manner to estimate the location of a WiFi-enabled device at an unknown location.

Radio-Signal Pattern Matching—

Downlink radio signals from many types of transmitters (e.g., television, commercial radio, downlink satellite, cellular telephone, WiFi, etc.) permeate our environment, and each location in space is associated with a unique combination of the location-dependent traits of those signals. This enables a map or database to be created that correlates the location-dependent traits of the downlink signals to location. Common names for this family of techniques include "Wireless Location Signatures," "RF Pattern Matching," and "RF Fingerprinting."

Radio-signal pattern matching can be used, for example, to estimate the location of a cell phone at an unknown location. The cell phone (i.e., the wireless terminal) observes the downlink signals it can receive that are transmitted from the cell towers (i.e., reference radios) at known locations and measures the location-dependent traits of those signals. Then the location of the cell phone can be estimated by pattern matching the measured values of the location-dependent traits of the observed downlink signals against the map. The location on the map whose expected or predicted values of the location-dependent traits that best matches the observed measurements is the estimate of the location of the wireless terminal.

Conversely, if the three or more cell towers can observe and measure the location-dependent traits of a signal transmitted by the cell phone, then the location of the cell phone can be estimated by pattern matching the measured values of the location-dependent traits of the observed uplink signal against a map that correlates the location-dependent traits of the uplink signal to location.

Radio-signal pattern matching can also be used, for example, in an analogous manner to estimate the location of a WiFi-enabled device at an unknown location.

SUMMARY OF THE INVENTION

The illustrative embodiment of the present invention is a method for estimating the location of a wireless terminal without some of the costs and disadvantages for doing so in the prior art.

The task of estimating the location of a wireless terminal is performed by determining the spatial relationship of the wireless terminal to one or more reference radios. By analyzing the location-dependent traits of the radio signals that are exchanged by the wireless terminal and the reference radio, a location engine can determine the location of the wireless terminal relative to the reference radio(s). The accuracy of the estimate of the location of the wireless terminal is dependent on the accuracy with which the location of the reference radio(s) is known or estimated.

If the wireless terminal cannot transmit a signal to a reference radio and cannot receive a signal from a reference radio, or the location engine does not possess a confirmed or estimated location for the reference radio, then the location engine has no touchstone on which to base the location of the wireless terminal. Therefore, it is advantageous for the location engine to know:

(i) the existence of as many reference radios as possible, and
(ii) the confirmed or estimated location of each reference radio, and
(iii) the transmission parameters of each signal transmitted by each radio, and
(iv) as much as possible about presence or absence of radio-frequency (RF) obstacles in the vicinity of each reference radio.

This information is, however, not always readily available.

The existence, location, and transmission parameters of almost all broadcast, navigation, and high-power telecommunications radios is a matter of public record and easily provided to a location engine. In contrast, the existence, location, and transmission parameters of most low-power/short-range radios are not. The low-power/short-range radios—such as, for example and without limitation, the WiFi base stations and WiFi-enabled devices in office buildings, stores, restaurants, hotels, etc. are, collectively, ideal as reference radios because of their ubiquity and short-range transmission range.

In the prior art, the process of learning the location and transmission parameters of these radios involves the physical and administrative inspection of each radio. Alternatively, crude estimates of the location of each radio can be obtained by drive testing—such as that performed by Google and Apple—past the buildings where such radios are located, but accurate estimates of the transmission parameters cannot be generated without information about the presence or absence of RF obstacles in the vicinity.

One project in the prior art uses a method that is analogous to tomography. The project attempts to gain information about the presence or absence of RF obstacles by flying a pair of radio-equipped aerial drones in an area of interest (e.g., around a building, for example, etc.). One drone transmits at signal at a known power from a known location and the other drone, also at a known location, measures the power of the received signal. Because the location of both drones is known, the distance between the drones can be calculated. Because the distance between the drones can be calculated, the free-space path loss of the signal from between the two drones can also be calculated. Therefore, any additional path loss can be attributed to one or more RF obstacles along the line between the two drones. By taking lots of such measurements and using the principles of tomography, estimates of the presence and absence of RF obstacles in the region of interest can be generated.

In contrast and in accordance with the illustrative embodiment, a single wireless terminal—hereinafter called a "scouting wireless terminal"—makes power measurements of a signal transmitted by a potential reference radio—whose location is unknown—at a plurality of locations. The illustrative embodiment is able to use those measurements—and knowledge of the location at which they were made—to generate:

(i) an estimate of the location of the newly-discovered reference radio, which might be inside or outside of the building, and
(ii) an estimate of the transmission power of the radio signal transmitted by the newly-discovered reference radio, and
(iii) a quantitative estimate of the RF obstacles in the vicinity of the radio, and
(iv) an estimate of whether a building exists in the vicinity of the radio by examining the spatial distribution of RF obstacles, and, if so, an estimate of the location of the footprint of the building, and
(v) an estimate of the excess path loss for at least a portion of the building, if the building is estimated to exist, and
(vi) an estimate of the nature and location of one or more architectural features (e.g., an auditorium, a bank of elevators, a vault, a collection of cubicles, a ballroom, a stairwell, etc.) of the building, if the building is estimated to exist.

And all of this can be generated based on a plurality of power measurements of signals transmitted from a radio at an unknown location within a building that is also at an unknown location, by a single scouting wireless terminal, that is outside of the building. This information is then available to the location engine for estimating the location of a wireless terminal.

DEFINITIONS

Figure 1:
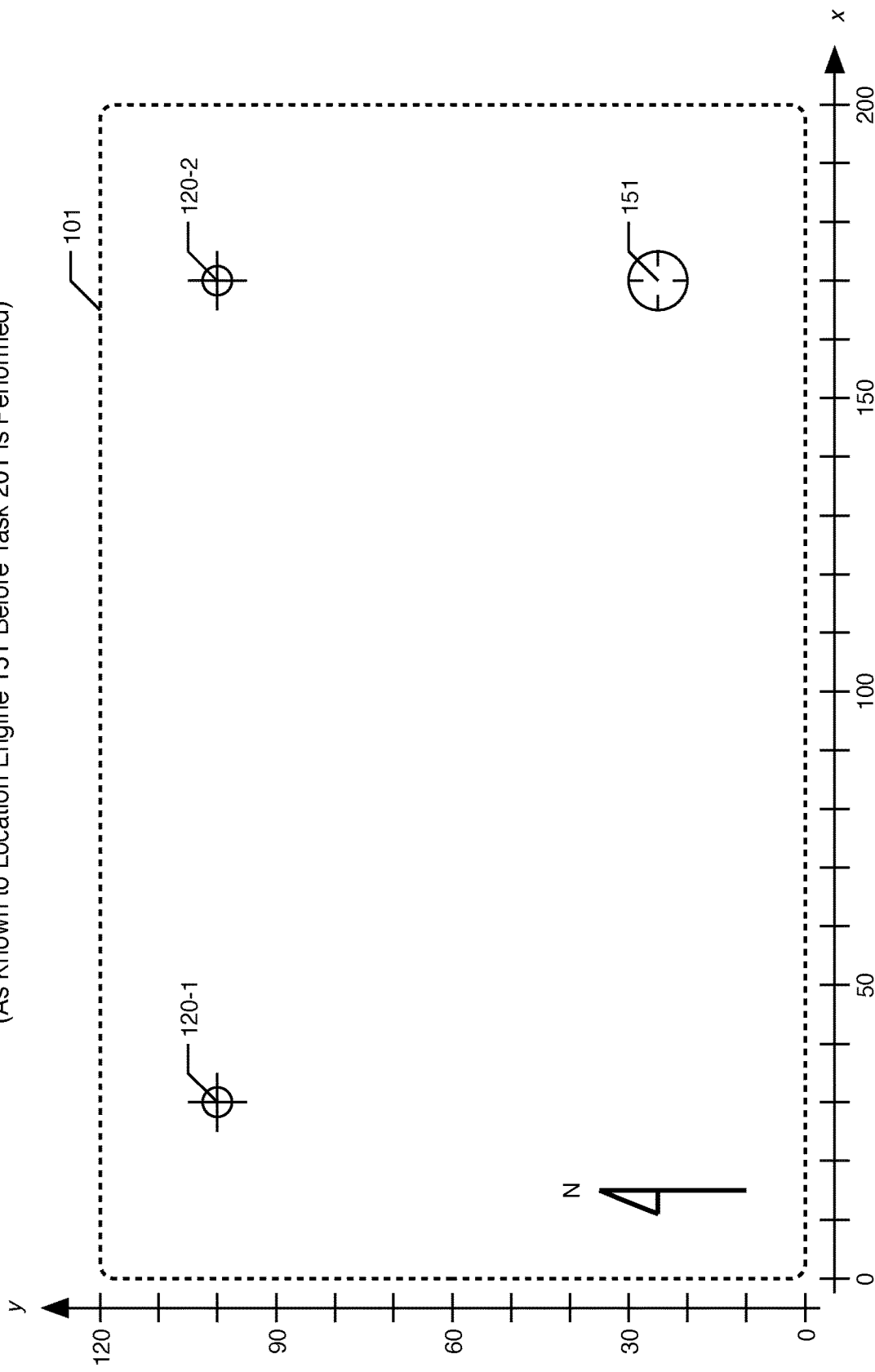
FIG. 1 depicts a map of geographic region 101 as known to location engine 151 before task 201 is performed.

Architectural Feature—For the purposes of this specification, an "architectural feature" is defined as aspect of a building that is:

(i) a volume of space that constitutes the presence of a substantial radio-frequency (RF) obstacle (e.g., a boiler, a vault, a stairwell, an elevator shaft, etc.), or (ii) a volume of space that constitutes the absence of a substantial radio-frequency (RF) obstacle (e.g., an auditorium, a ballroom, a collection of cubicles, etc.).

The likelihood of a wireless terminal being located at or near an architectural feature can be high or low or neutral depending, for example and without limitation, on the time of day, the day of the week, the day of the year, the nature of the feature, and the existence and proximity of other features.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Building—For the purposes of this specification, a "building" is defined as a man-made structure, regardless of whether it is intended to be inhabited (e.g., a house, an office building, etc.) or not inhabited (e.g., a radio tower, an oil tank, etc.).

Excess Path Loss—For the purposes of this specification, the "excess path loss" is defined as the attenuation experienced by a hypothetical radio signal—in excess of the free-space path loss—as it propagates through a non-vacuum medium in a straight line from Point A to Point B.

Free-Space Path Loss—For the purposes of this specification, the "free-space path loss" is defined as the attenuation experienced by a hypothetical radio signal as it propagates through a vacuum in a straight line from Point A to Point B.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the phrase "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:

(i) a measurement of a location-dependent trait (e.g., signal strength, etc.) of a radio signal as received by the wireless terminal, (ii) the identity of a radio signal as received by the wireless terminal (e.g., in a service environment in which different radio signals transmitted from different locations are assigned different identities, etc.), or (iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:

(i) the location of the transmitter of the signal, or (ii) the location of the receiver of the signal, or (iii) both i and ii.

For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:

(i) one or more location-dependent traits of one or more radio signals received or transmitted by a wireless terminal, or (ii) the identity of one or more radio signals received or transmitted by a wireless terminal, or (iii) both i and ii, at each of a plurality of locations.

Partition—For the purposes of this specification, a "partition" is defined as a volume of space that is deemed to have a uniform excess path loss per meter for a signal characterized by a wavelength.

Processor—For the purposes of this specification, a "processor" is defined as hardware or hardware and software that performs mathematical and/or logical operations.

Power—For the purposes of this specification, the "power" of a radio signal is defined as the locally-averaged signal strength of the radio signal.

Radio—For the purposes of this specification, a "radio" is defined as hardware or hardware and software that is capable of telecommunications via an unguided (i.e., wireless) radio signal of frequency less than 600 GHz. [6o] Radio-Frequency Environment—For the purposes of this specification the term "radio-frequency environment" is defined as a quantitative characterization of the nature and location of the radio-frequency obstacles in the vicinity of the reference radio, the wireless terminal, and the signal path between the reference radio and the wireless terminal.

Radio-Frequency Obstacle—For the purposes of this specification the term "radio-frequency obstacle" is defined as matter that can refract, diffract, reflect, or absorb a radio signal used in telecommunications.

Reasonable Estimate—For the purposes of this specification, the term "reasonable estimate" and its inflected forms is defined as an estimate that is based on empirical data and logic. A reasonable estimate is not necessarily correct, but it is not a blind guess.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Total Path Loss—For the purposes of this specification, the "total path loss" is defined as the sum of the free-space path loss plus the excess path loss, if any, experienced by a hypothetical radio signal as it propagates in a straight line from Point A to Point B.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive.

DETAILED DESCRIPTION

FIG. 1 depicts a map of geographic region 101 as known to location engine 151 before task 201 is performed. Geographic region 101 comprises: scouting wireless terminal 111 (not depicted in FIG. 1), user wireless terminal 112 (not depicted in FIG. 1), reference radio 120-1, reference radio 120-2, reference radio 120-3 (not depicted in FIG. 1), and location engine 151.

Reference radio 120-1, reference radio 120-2, reference radio 120-3, and location engine 151 are immobile. In contrast, scouting wireless terminal 111 and user wireless terminal 112 are mobile.

Before task 201 is performed, location engine 151 comprises:
 (i) a record of the existence of scouting wireless terminal 111, and
 (ii) a record of the existence of user wireless terminal 112, and
 (iii) a record of the existence of reference radio 120-1, and
 (iv) a record of the existence of reference radio 120-2, and
 (v) a record of the existence of location engine 151 (i.e., itself), and
 (vi) a record of the location of reference radio 120-1, and
 (vii) a record of the location of reference radio 120-2, and
 (viii) a record of the location of location engine 151 (i.e., itself), and
 (ix) a record of the quantitative transmission parameters of the downlink control channel radio signal transmitted by reference radio 120-1, and
 (x) a record of the quantitative transmission parameters of the downlink control channel radio signal transmitted by reference radio 120-2.

Because of (vi), (vii), and (viii), the locations of reference radio 120-1, reference radio 120-2, and location engine 151 are depicted in FIG. 1. It will be clear to those skilled in the art, after reading this disclosure, how to make and use alternative embodiments of the present invention in which the location engine does not comprise (i) or (ii) or (iii) or (iv) or (v) or (vi) or (vii) or (viii) or (ix) or (x) or any combination of (i), (ii), (iii), (iv), (v), (vi), (vii), (viii), (ix), and (x) before task 201 is performed.

Before task 201 is performed, location engine 151 does not comprise:
 (i) a record of the location of scouting wireless terminal 111, or
 (ii) a record of the location of user wireless terminal 112, or
 (iii) a record of the existence of reference radio 120-3, or
 (iv) a record of the location of reference radio 120-3, or
 (v) a record of the quantitative transmission parameters of the downlink control channel radio signal transmitted by reference radio 120-3, or
 (vi) a record of the presence of one or more radio-frequency (RF) obstacles in geographic region 101, or
 (vii) a record of an area that is absent of one or more radio-frequency (RF) obstacles in geographic region 101.

Because of (i), (ii), (iii), (iv), and (vi), scouting wireless terminal 111, user wireless terminal 112, reference radio 120-3, and radio-frequency obstacles are omitted from FIG. 1. It will be clear to those skilled in the art, after reading this disclosure, how to make and use alternative embodiments of the present invention in which location engine 151 comprises (i) or (ii) or (iii) or (iv) or (v) or (vi) or (vii) or any combination of (i), (ii), (iii), (iv), (v), (vi), and (vii) before task 201 is performed.

In accordance with the illustrative embodiment, geographic region 101 is approximately rectangular, but it will be clear to those skilled in the art, after reading this disclosure, how to make and use alternative embodiments of the present invention in which the geographic region has any shape (e.g., irregular, oval, triangular, etc.).

In accordance with the illustrative embodiment, geographic region 101 is:
 (i) substantially planar (i.e., absent mountains and deep valleys), and
 (ii) substantially horizontal, and
 (iii) at 1.5 meters above ground level.

In accordance with the illustrative embodiment, scouting wireless terminal 111, user wireless terminal 112, reference radio 120-1, reference radio 120-2, and reference radio 120-3 are all substantially within the plane of geographic region 101. It will be clear to those skilled in the art, after reading this disclosure, how to make and use alternative embodiments of the present invention in which one or more of wireless terminals and reference radios are not substantially in the same plane (e.g., one or more of them is on or in a tall building, on a mast, or on a hill, the geographic region is so large that the curvature of the Earth must be considered, etc.).

In accordance with the illustrative embodiment, geographic region 101 spans 200 meters (measured East-West) by 120 meters (measured North-South) and, therefore, comprises 24,000 square meters. It will be clear to those skilled in the art, after reading this disclosure, how to make and use alternative embodiments of the present invention in which the geographic region of interest has any dimensions and encompasses any area (e.g., 10,000 square meters, 50,000 square meters, 100,000 square meters, 500,000 square meters, 1 square kilometer, 100 square kilometers, 10,000 square kilometers, etc.).

Each location in geographic region 101 is designated by a Cartesian coordinate measured in meters from an origin, which is located at the southwest corner of geographic region 101, as shown in FIG. 1. The coordinates of reference radio 120-1 and reference radio 120-2 are listed in Table 1 below:

TABLE 1

Coordinates of Reference Radio 120-1 and Reference Radio 120-2

| Reference Radio | Coordinates |
| --- | --- |
| reference radio 120-1 | (30, 100, 1.5) |
| reference radio 120-2 | (170, 100, 1.5) |

In accordance with the illustrative embodiment, scouting wireless terminal 111 is a standard off-the-shelf commercially-available cellular smartphone (e.g., an Apple iPhone, a Samsung Galaxy, etc.) that is capable of:
 (i) being carried to various locations in the vicinity of reference radio 120-3, and
 (ii) receiving, decoding, and measuring the power of the 2.4 GHz WiFi downlink control channel radio signal transmitted by reference radio 120-3 at each of those locations, and
 (iii) determining its location with GPS at each of those locations, and (iv) transmitting:
(1) the identity of reference radio 120-3,
(2) the value of each measurement, and
(3) the coordinates of the location where each measurement was made to location engine 151.

It will be clear to those skilled in the art how to make and use scouting wireless terminal 111.

In accordance with the illustrative embodiment, user wireless terminal 112 is a standard off-the-shelf commercially-available cellular smartphone (e.g., an Apple iPhone, a Samsung Galaxy, etc.) that is capable of:
(i) receiving, decoding, and measuring the power of the 800 MHz downlink control channel radio signal transmitted by reference radio 120-1, and
(ii) transmitting the identity of reference radio 120-1 and the value of the measurement to location engine 151, and
(iii) receiving, decoding, and measuring the power of the 800 MHz downlink control channel radio signal transmitted by reference radio 120-2, and
(iv) transmitting the identity of reference radio 120-2 and the value of the measurement to location engine 151, and
(v) receiving, decoding, and measuring the power of the 2.4 GHz downlink control channel radio signal transmitted by reference radio 120-3, and
(vi) transmitting the identity of reference radio 120-3 and the value of the measurement to location engine 151, and
(vii) receiving an estimate of its location from location engine 151, and
(viii) running a location-based application (e.g., Facebook, Find My Friends, Weather, etc.) that uses the estimate of its location obtained from location engine 151.

It will be clear to those skilled in the art how to make and use user wireless terminal 112.

In this specification, wireless terminal 111 is prefixed with the term "scouting" solely to emphasize the difference in function it performs in contrast to the functions performed by "user" wireless terminal 112. In accordance with the illustrative embodiment, there is no hardware or software difference between scouting wireless terminal 111 and user wireless terminal 112. Furthermore, it will be clear to those skilled in the art, after reading this disclosure, that in another situation user wireless terminal 112 can and might perform the functions performed herein by scouting wireless terminal 111 and scouting wireless terminal 111 can and might perform the functions performed by user wireless terminal 112.

In accordance with the illustrative embodiment, reference radio 120-1 transmits a downlink control channel radio signal from an omnidirectional antenna at 40 dBm. The downlink control channel radio signal is characterized by a first wavelength $\lambda_1 = c/800$ MHz=0.375 meters. In accordance with the illustrative embodiment, reference radio 120-1 is a cellular base station (e.g., 3G, 4G LTE, 5G NR, etc.), but it will be clear to those skilled in the art, after reading this disclosure, how to make and use alternative embodiments of the present invention in which the reference radio provides any service (e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-1.

In accordance with the illustrative embodiment, reference radio 120-2 transmits a downlink control channel radio signal from an omnidirectional antenna at 40 dBm. The downlink control channel radio signal is characterized by the first wavelength $\lambda_1 = c/800$ MHz=0.375 meters. In accordance with the illustrative embodiment, reference radio 120-2 is a cellular base station (e.g., 3G, 4G LTE, 5G NR, etc.), but it will be clear to those skilled in the art, after reading this disclosure, how to make and use alternative embodiments of the present invention in which the reference radio provides any service ((e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-2.

In accordance with the illustrative embodiment, reference radio 120-3 transmits a downlink control channel radio signal. The downlink control channel radio signal is characterized by a second wavelength $\lambda_2 = c/2.4$ GHz=0.125 meters. In accordance with the illustrative embodiment, reference radio 120-3 is an 802.11 WiFi access point, but it will be clear to those skilled in the art, after reading this disclosure, how to make and use alternative embodiments of the present invention in which the reference radio provides any service (e.g., transmit only, transmit and receive, voice, data, video, etc.) and transmits any type of signal as characterized by any wavelength at any transmit power. In accordance with the illustrative embodiment, the transmission parameters of the downlink control channel radio signal are constant. It will be clear to those skilled in the art how to make and use reference radio 120-3.

In accordance with the illustrative embodiment, location engine 151 comprises the hardware and software capable of performing the computational tasks described below and in the accompanying figures. Location engine 151 is connected via the Internet and wireline transmission facilities to reference radio 120-1 and reference radio 120-2. In accordance with the illustrative embodiment, reference radio 120-3 is behind a secure firewall, and, therefore, location engine 151 does not have direct unrestricted wireline access to reference radio 120-3 or the wireless terminals that have been granted wireless access to reference radio 120-3. Furthermore, location engine 151 is connected via the Internet and wireless (e.g., cellular, etc.) connectivity to scouting wireless terminal 111 and user wireless terminal 112.

Location engine 151 comprises a location-based application (e.g., iOS's "Find My Friends" app, Android's "Waze" app, iOS's Lyft app etc.) that uses the estimate of the location of user wireless terminal 112 generated in task 203. In accordance with the illustrative embodiment, location engine 151 exists within geographic region 101. It will be clear to those skilled in the art, however, after reading this disclosure, how to make and use alternative embodiments of the present invention in which the location engine exists outside of the geographic region of interest. Furthermore, it will be clear to those skilled in the art, after reading this disclosure, how to make and use alternative embodiments of the present invention in which the functionality performed by location engine 151 is distributed among various geographically-dispersed hardware devices (e.g., is performed by servers in "the Cloud," partially on scouting wireless terminal 111, partially on user wireless terminal 112, etc.).

Figure 2:
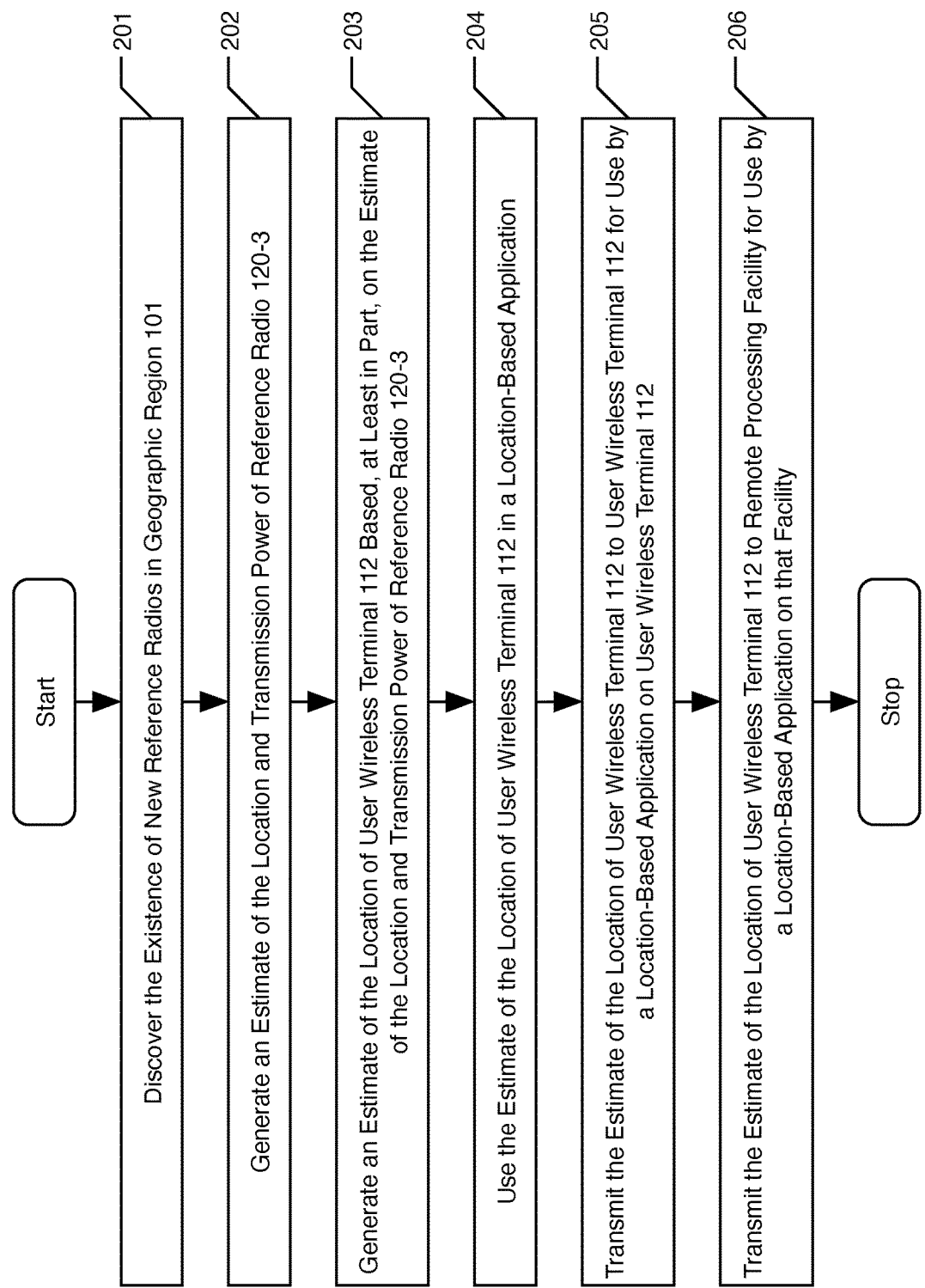
FIG. 2 depicts a flowchart of the tasks performed in accordance with the illustrative embodiment of the present invention.

FIG. 2 depicts a flowchart of the tasks performed in accordance with the illustrative embodiment of the present invention.

At task 201, location engine 151 and scouting wireless terminal 111 cooperate to discover one or more new reference radios in geographic region 101. In accordance with the illustrative embodiment, scouting wireless terminal 111 is carried by a technician whose job it is to systematically patrol geographic region 101 and discover new reference radios. As scouting wireless terminal 111 is carried throughout geographic region 101, it continually scans for 2.4 GHz WiFi downlink control channel radio signals. In accordance with the illustrative embodiment, scouting wireless terminal 111 does not comprise a record of all of the reference radios that are known to location engine 151, but it does comprise a record of all of the reference radios that it has previously received and decoded. Therefore, whenever scouting wireless terminal 111 receives and decodes the 2.4 GHz WiFi downlink control channel radio signal of a reference radio that it has not previously received and decoded, it notifies location engine 151 of that fact.

At task 202, location engine 151 and scouting wireless terminal 111 cooperate to:
  (i) measure, at multiple locations, the power of the downlink control channel radio signal that is transmitted by reference radio 120-3, and
  (ii) generate an estimate of the location of reference radio 120-3, and
  (iii) generate an estimate of the transmission power of the downlink control channel radio signal that is transmitted by reference radio 120-3.

Task 202 is described in detail below and in the accompanying figures.

At task 203, location engine 151 and user wireless terminal 112 cooperate to generate an estimate of the location of user wireless terminal 112 based, at least in part, on:
  (i) a measurement by user wireless terminal 112 of the power of the downlink control channel radio signal that is transmitted by reference radio 120-3, and
  (ii) the estimate of the location of reference radio 120-3 that was generated in task 202, and
  (iii) the estimate of the transmission power of the downlink control channel radio signal that is transmitted by reference radio 120-3 and that was generated in task 202.

It will be clear to those skilled in the art, after reading this disclosure, how to make and use alternative embodiments of the present invention that accomplish task 203 with (i) plus either (ii) or (iii). Task 203 is described in detail below and in the accompanying figures.

At task 204, location engine 151 uses the estimate of the location of user wireless terminal 112, which was generated in task 203, in a location-based application. It will be clear to those skilled in the art how to make and use embodiments of the present invention that perform task 204.

At task 205, location engine 151 transmits the estimate of the location of user wireless terminal 112, which was generated in task 203, to user wireless terminal 112 for use by a location-based application (e.g., Facebook, Find My Friends, Weather, etc.) on user wireless terminal 112. It will be clear to those skilled in the art how to make and use embodiments of the present invention that perform task 205.

At task 206, location engine 151 transmits the estimate of the location of user wireless terminal 112 to a remote data processing system for use by a location-based application (e.g., E-911, etc.) on that system. It will be clear to those skilled in the art how to make and use embodiments of the present invention that perform task 206.

Figure 3:
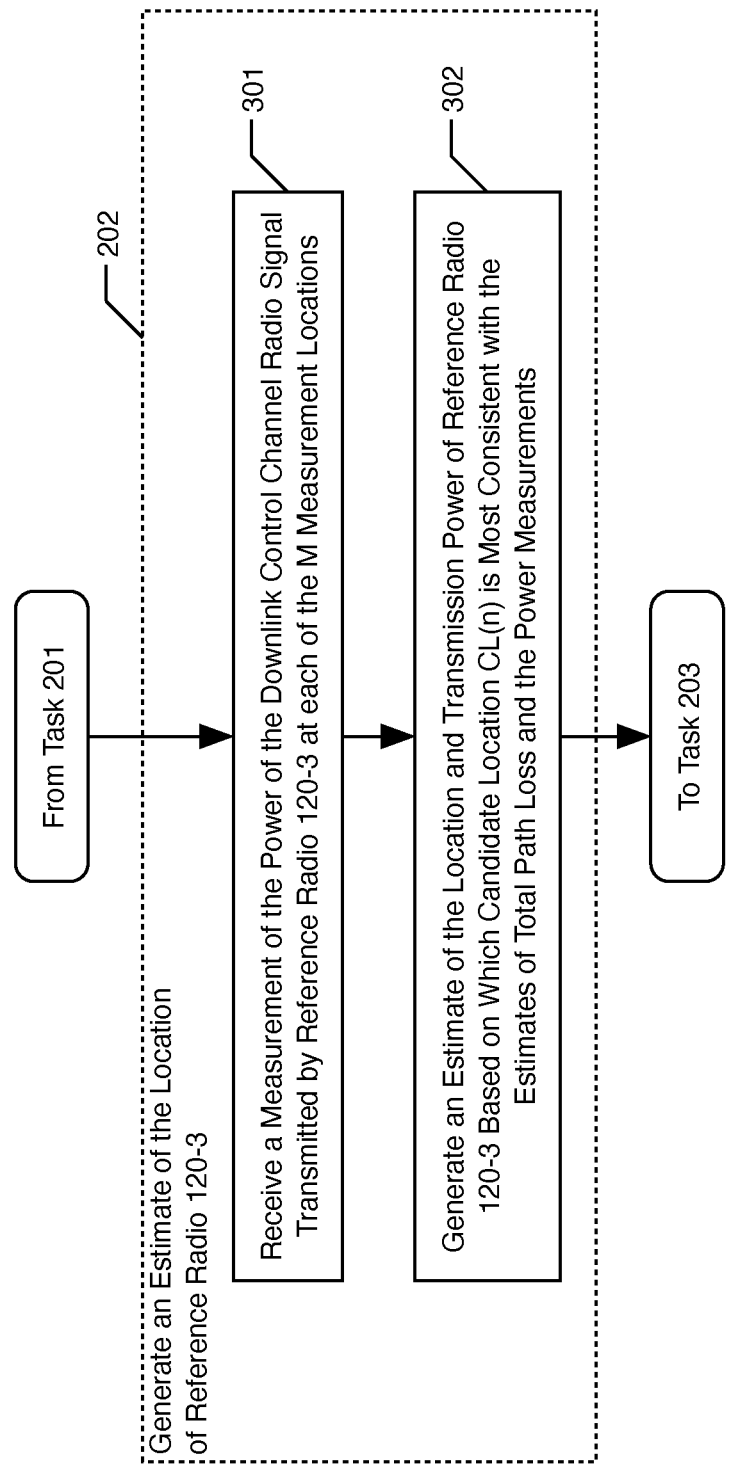
FIG. 3 depicts a flowchart of the subtasks performed in accordance with task 202—generating an estimate of the location of reference radio 120-3.

FIG. 3 depicts a flowchart of the subtasks performed in accordance with task 202—generating an estimate of the location of reference radio 120-3.

At task 301, scouting wireless terminal 111 makes a measurement of the locally-averaged signal strength of the downlink control channel radio signal of reference radio 120-3 at M measurement locations in geographic region 101. The M measurements are designated 1, 2, 3, . . . , m, . . . , M, where M and m are positive integers and m is selected from the set $\{1, 2, 3, \ldots, M\}$.

The value of the mth measurement is MV(m), which is denominated in dBm. The mth measurement is made at measurement location ML(m), which equals the (x,y,z) coordinates of a location in geographic region 101.

In accordance with the illustrative embodiment, all of the measurements are made in the plane of geographic region 101, which is 1.5 meters above ground level, but it will be clear to those skilled in the art, after reading this disclosure, how to make and use alternative embodiments in which some or all of the measurements are made at above or below ground level.

In accordance with the illustrative embodiment, M=4, but it will be clear to those skilled in the art, after reading this disclosure, how to make and use alternative embodiments of the present invention with any number of measurements.

In accordance with the illustrative embodiment, the technician decides how many measurements are made (i.e., the value of M), but it will be clear to those skilled in the art, after reading this disclosure, how to make and use alternative embodiments of the present invention in which:
  (i) scouting wireless terminal 111, or
  (ii) location engine 151, or
  (iii) the technician, or
  (iv) any combination of i, ii, and iii
decide how many measurements are made.

In accordance with the illustrative embodiment, the technician decides where each measurement is made, but it will be clear to those skilled in the art, after reading this disclosure, how to make and use alternative embodiments of the present invention in which:
  (i) scouting wireless terminal 111, or
  (ii) location engine 151, or
  (iii) the technician, or
  (iv) any combination of i, ii, and iii
decide where each measurement is made.

In accordance with the illustrative embodiment, the technician carries scouting wireless terminal 111 to each measurement location ML(m). When scouting wireless terminal 111 is at measurement location ML(m), scouting wireless terminal 111:
  (i) receives, decodes, and measures the power of the 2.4 GHz WiFi downlink control channel radio signal that is transmitted by reference radio 120-3 to generate measurement MV(m), and
  (ii) determines its location ML(m) with GPS, and
  (iii) transmits:
    (1) the identity of reference radio 120-3, and
    (2) the measurement value MV(m), and
    (3) the coordinates of measurement location ML(m)
  to location engine 151.

Figure 4:
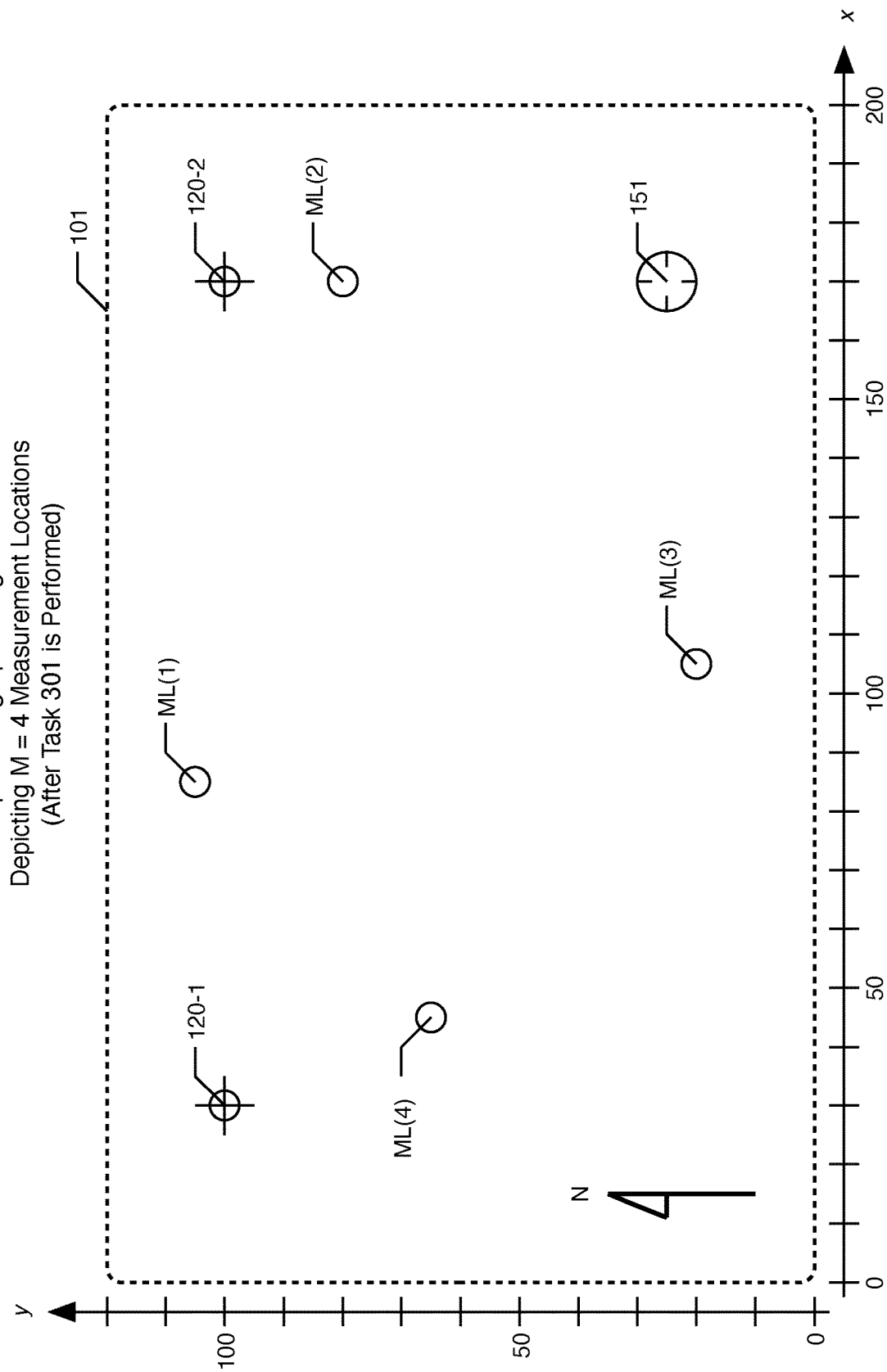
FIG. 4 depicts a map of geographic region 101 that depicts the location of the M=4 measurement locations after task 301 is performed.

In accordance with the illustrative embodiment, the M measurement values and their associated measurement locations ML(1) through ML(M) are stored in location engine 151. They are also depicted in FIG. 4 and in Table 2:

TABLE 2

Values of Measurement MV(m) at Measurement
Location ML(m) for Reference Radio 130-3

| m | Measurement Value MV(m) | Measurement Location ML(m) |
|---|---|---|
| 1 | −55 dBm | (85, 105, 1.5) |
| 2 | −50 dBm | (170, 80, 1.5) |
| 3 | −57 dBm | (105, 20, 1.5) |
| 4 | −60 dBm | (45, 65, 1.5) |

Figure 5:
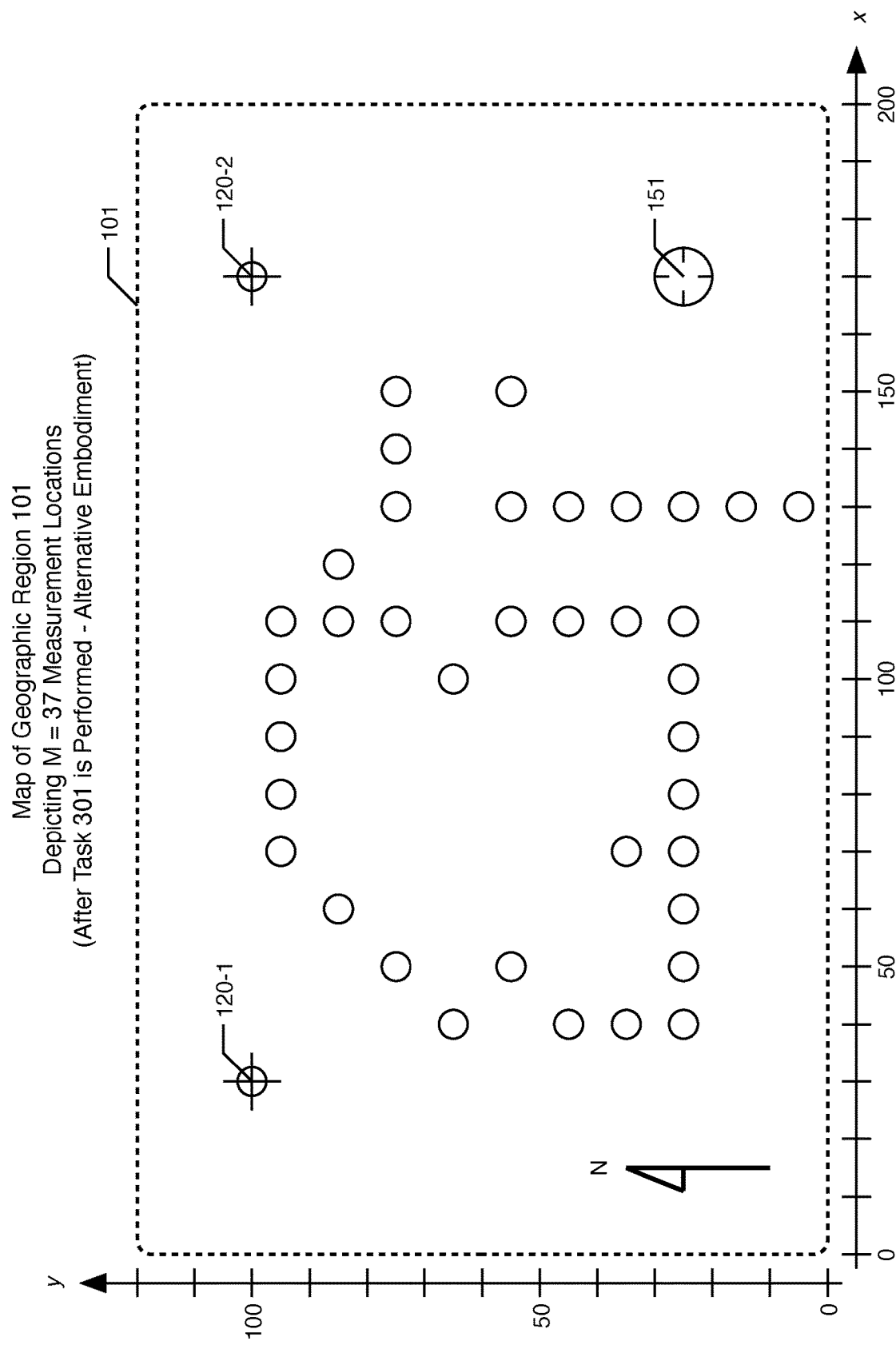
FIG. 5 depicts a map of geographic region 101 in accordance with an alternative embodiment of the present invention, which map depicts the location of M=37 measurement locations.

FIG. 5 depicts a map of geographic region 101 in accordance with an alternative embodiment of the present invention, which map depicts the location of M=37 measurement locations.

In accordance with the illustrative embodiment, the M measurement locations are spatially diverse. When two measurements are not spatially diverse, they are at least partially redundant and overweight the data from that vicinity.

When the technician has no idea that a reference radio is nearby, the technician can take measurements on a square or hexagonal lattice, while omitting those places where he or she cannot get to because of physical obstacles or legal impediments or logistical efficiency. In contrast, when the technician suspects that he or she knows the location of a newly-discovered reference radio, a good rule of thumb is for the measurement locations to exhibit azimuthal and radial diversity around the suspected location. This can be achieved, for example and without limitation, by circling the suspected location at a few times at different radii.

It will be clear to those skilled in the art, after reading this disclosure, how to make and use alternative embodiments of the present invention in which the measurements are made at regular intervals.

In accordance with the illustrative embodiment, there are some assumptions regarding task 301. For example, it is assumed that:

(i) the location of reference radio 120-3 does not change during task 301, and
(ii) the transmission power of reference radio 120-3 does not change during task 301, and
(iii) the antenna gain of reference radio 120-3 is the same in all directions (i.e., reference radio 120-3 comprises an omnidirectional antenna), and
(iv) the antenna gain of scouting wireless terminal 111 is the same in all directions (i.e., scouting wireless terminal 111 comprises an omnidirectional antenna).

These assumptions might be true or false or partially true, and the degree to which they are true or false will impact the accuracy of the estimates generated by the embodiment of the invention. In any case, it will be clear to those skilled in the art how to perform task 301.

At task 302, location engine 151 generates:
(i) an estimate of the location of reference radio 120-3, and
(ii) an estimate of the transmission power for the downlink control channel radio signal transmitted by reference radio 120-3 based on which candidate location of reference radio 120-3 is most consistent with the measurement values and the candidate predictions of total path loss. Task 302 is described in detail below and in the accompanying figures.

Figure 6:
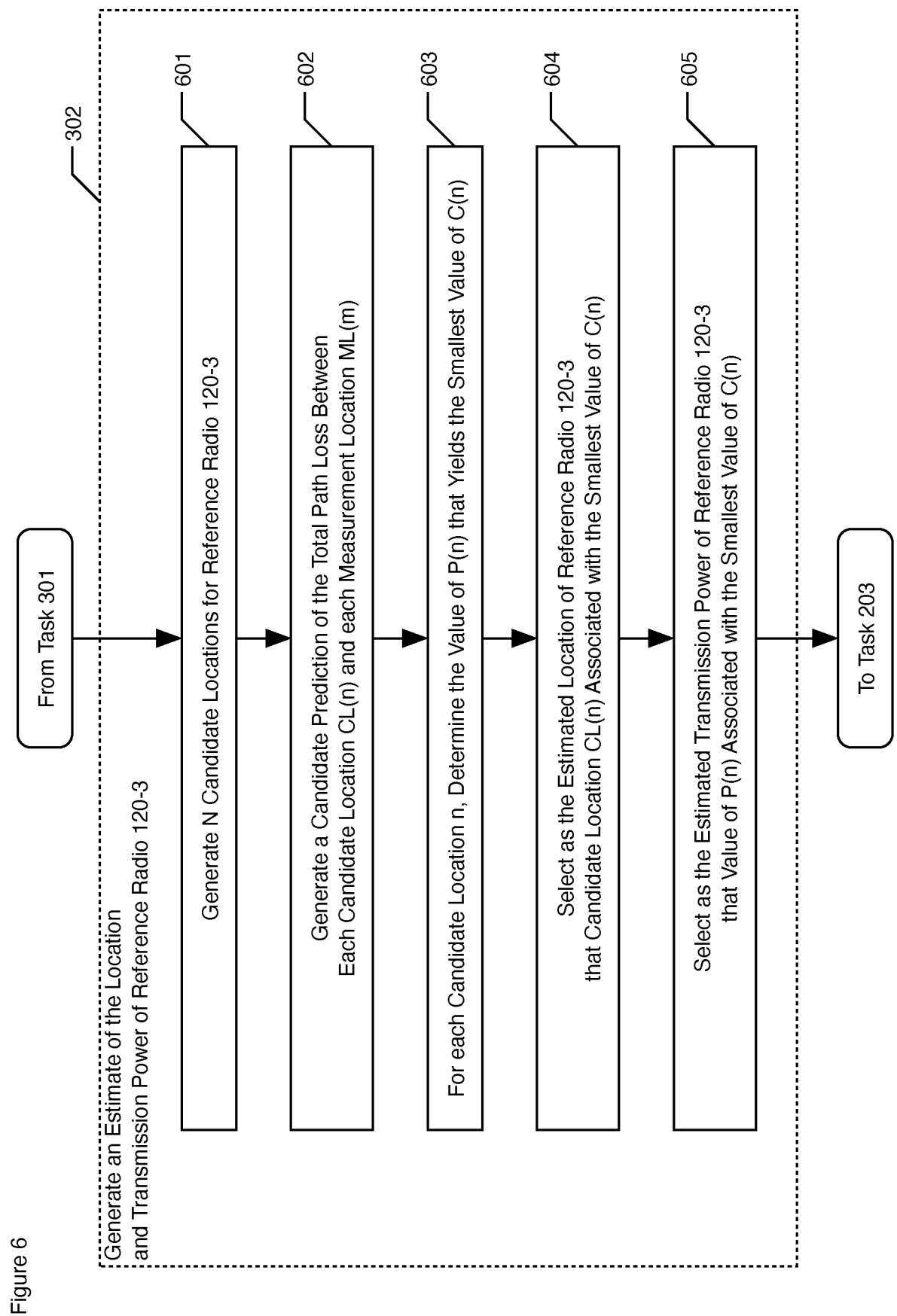
FIG. 6 depicts a flowchart of the subtasks performed in accordance with task 302—generating an estimate of the location and transmission power of reference radio 120-3.

FIG. 6 depicts a flowchart of the subtasks associated with performing task 302 in accordance with the illustrative embodiment of the present invention.

At task 601, location engine 151 generates N candidate locations for the location of reference radio 120-3. The N candidate locations are designated 1, 2, 3, . . . , n, . . . , N, where N and n are positive integers and n is selected from the set {1, 2, 3, . . . , N}.

The nth candidate location is at candidate location CL(n), which equals the (x,y,z) coordinate of a location in geographic region 101.

In accordance with the illustrative embodiment, all of the candidate locations are in the plane of geographic region 101, which is 1.5 meters above ground level, but it will be clear to those skilled in the art, after reading this disclosure, how to make and use alternative embodiments of the present invention in which some or all of the candidate locations are at any altitude.

In general, better estimates of the location of reference radio 120-3 are generated:

(i) for larger values of N (so as to increase the likelihood that a candidate location is near the location suggested by the empirical data), and
(ii) when the N candidate locations are spatially diverse (so as to increase the likelihood that a candidate location is near the location suggested by the empirical data), and
(iii) for larger values of M (so as to provide more empirical data on which to base the estimates), and
(iv) when the M measurement locations are spatially diverse (so as to provide higher quality empirical data), and
(v) when the M measurement locations are balanced and radially and azimuthally diverse around each candidate location (so as to provide higher quality empirical data).

For example, candidate locations on a 2.5 meter ($\Delta x$) by 2.5 meter ($\Delta y$) by 2.5 meter ($\Delta z$) orthogonal lattice are, in general, better than randomly-located candidate locations. Candidate locations on a 1 meter ($\Delta x$) by 1 meter ($\Delta y$) by 1 meter ($\Delta z$) orthogonal lattice are also likely to yield good estimates.

To facilitate the reader's comprehension of the illustrative embodiment, the illustrative embodiment is presented with N=4. It will be clear to those skilled in the art, after reading this disclosure, how to make and use alternative embodiments of the present invention with any number of measurements.

Figure 7:
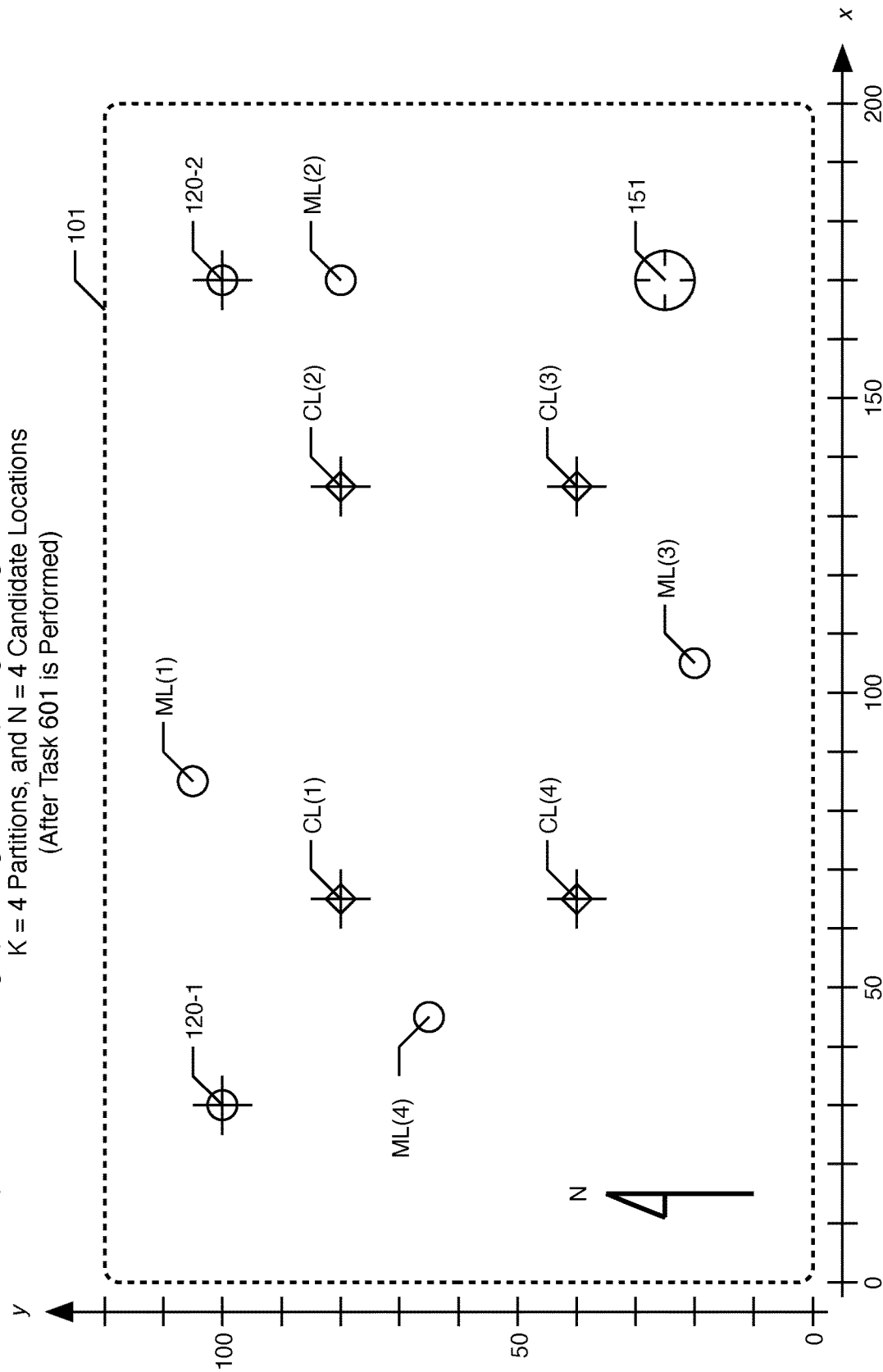
FIG. 7 depicts a map of geographic region 101 as known to location engine 151 after task 601 is performed.

In accordance with the illustrative embodiment, the N candidate locations CL(1) through CL(N) are stored in location engine 151. They are also depicted in FIG. 7 and in Table 3:

TABLE 3

Coordinates of Candidate Locations

| n | Candidate Location CL(n) |
|---|---|
| 1 | (65, 80, 1.5) |
| 2 | (135, 80, 1.5) |
| 3 | (135, 40, 1.5) |
| 4 | (65, 40, 1.5) |

At task 602, location engine 151 generates a candidate prediction of the total path loss A(n,m) in dB for a hypothetical 2.4 GHz signal that propagates from candidate location CL(n) to measurement location ML(m), for all n and m. In total, task 602 generates N·M=16 candidate predictions of total path loss A(n,m).

In accordance with the illustrative embodiment, location engine 151 does not comprise a record of any radio-frequency obstacles in the vicinity of the N candidate locations, the M measurement locations, or the signal paths between the N candidate locations and the M measurement locations. To facilitate the reader's comprehension, the illustrative embodiment, the model of total path loss comprises only one component: the free-space path loss FSPL(n,m) from the candidate locations CL(n) to the measurement location ML(m).

$$A(n,m) = FSPL(n,m) \tag{Eq. 1a}$$

It will be clear to those skilled in the art, after reading this disclosure, how to make and use alternative embodiments of the present invention in which the model of total path loss comprise more components or different components that predict general or specific causes of excess path loss (e.g., exterior walls of buildings, forests, non-straight-line effects, reflections, refraction, multipath, building interiors, etc.).

In accordance with the illustrative embodiment, the candidate prediction of the free-space path loss FSPL(n,m) from the candidate locations CL(n) to the measurement location ML(m) equals:

$$FSPL(n,m) = 20 \log_{10}(d(n,m)) + 20 \log_{10}(f) + 32.45 \tag{Eq. 1b}$$

wherein:
- $f$ is denominated in GHz and is the frequency of the signal, and
- $d(n,m)$ is denominated in meters and is the entire straight-line distance from candidate location CL(n) to measurement location ML(m).

The straight-line distance $d(n,m)$ from candidate location CL(n) to measurement location ML(m) is computed using the Pythagorean Theorem in well-known fashion.

The 16 values of A(n,m) are stored in location engine 151 and are listed in Table 4:

TABLE 4

Candidate Predictions of Total Path Loss A(n, m) for 2.4 GHz Signal

| Candidate Location CL(n) | Measurement Location ML(m) | Distance d | Candidate Predictions of Total Path Loss A(n, m) |
|---|---|---|---|
| CL(1) | ML(1) | d ≈ 32 m | A(1, 1) ≈ 70 dB |
|  | ML(2) | d ≈ 105 m | A(1, 2) ≈ 80 dB |
|  | ML(3) | d ≈ 72 m | A(1, 3) ≈ 77 dB |
|  | ML(4) | d ≈ 25 m | A(1, 4) ≈ 68 dB |
| CL(2) | ML(1) | d ≈ 56 m | A(2, 1) ≈ 75 dB |
|  | ML(2) | d ≈ 35 m | A(2, 2) ≈ 71 dB |
|  | ML(3) | d ≈ 67 m | A(2, 3) ≈ 77 dB |
|  | ML(4) | d ≈ 91 m | A(2, 4) ≈ 79 dB |
| CL(3) | ML(1) | d ≈ 82 m | A(3, 1) ≈ 78 dB |
|  | ML(2) | d ≈ 53 m | A(3, 2) ≈ 75 dB |
|  | ML(3) | d ≈ 36 m | A(3, 3) ≈ 71 dB |
|  | ML(4) | d ≈ 93 m | A(3, 4) ≈ 79 dB |
| CL(4) | ML(1) | d ≈ 68 m | A(4, 1) ≈ 77 dB |
|  | ML(2) | d ≈ 112 m | A(4, 2) ≈ 81 dB |
|  | ML(3) | d ≈ 45 m | A(4, 3) ≈ 73 dB |
|  | ML(4) | d ≈ 32 m | A(4, 4) ≈ 70 dB |

At task 603, location engine 151 determines which candidate location CL(n) is most consistent with the candidate predictions of total path loss A(n,m) and the measurement values MV(m), for all n and m.

To accomplish this, a metric C(n) is generated that quantitatively evaluates the goodness of fit of each candidate location CL(n) to:
(i) the candidate predictions of total path loss A(n,m), and
(ii) a candidate value P(n) of the transmission power of reference radio 120-3, and
(iii) the measurement values MV(m)

for all n and m. In accordance with the illustrative embodiment, the goodness of fit of each candidate location n is measured by determining which value of P(n) minimizes the value of C(n), where C(n) is defined by the objective function:

$$C(n) = \Sigma_{\forall m}(MV(m) - P(n) + A(n,m))^2 \tag{Eq. 2}$$

Of the n candidate locations that are evaluated, the candidate location with the best fit—the lowest value of C(n)—is estimated to be the location of reference radio 120-3. It will be clear to those skilled in the art how to determine the value of P(n) that yields the minimum value of C(n) using well-known computational optimization techniques (e.g., hill climbing with random restart, genetic algorithms, etc.).

In accordance with the illustrative embodiment, the minimum value of C(n), for all n, is listed in Table 5 below, along with the value of P(n) that yields the minimum value of C(n):

TABLE 5

Goodness of Fit Scores

| n | Minimum Value of C(n) | P(n) |
|---|---|---|
| 1 | C(1) ≈ 270 | P(1) ≈ 18 dBm |
| 2 | C(2) ≈ 1.6 | P(2) ≈ 20 dBm |
| 3 | C(3) ≈ 65 | P(3) ≈ 20 dBm |
| 4 | C(4) ≈ 250 | P(4) ≈ 20 dBm |

It will be clear to those skilled in the art, after reading this disclosure, how to make and use alternative embodiments of the present invention that use a different objective function than that in Equation 2.

At task 604, location engine 151 generates the estimate of the location of reference radio 120-3 by selecting that candidate location CL(n) associated with the smallest value of C(n). Because the minimum value of C(2) is less than the minimum value of C(1), C(3), and C(4), location engine 151 decides that candidate location CL(2) is more likely—based on the available empirical evidence—to be closer to the actual location of reference radio 120-3 than the other candidate locations, and, therefore, location engine 151 estimates the location of reference radio 120-3 to be at candidate location CL(2), which is at coordinates (135, 80, 1.5).

Figure 8:
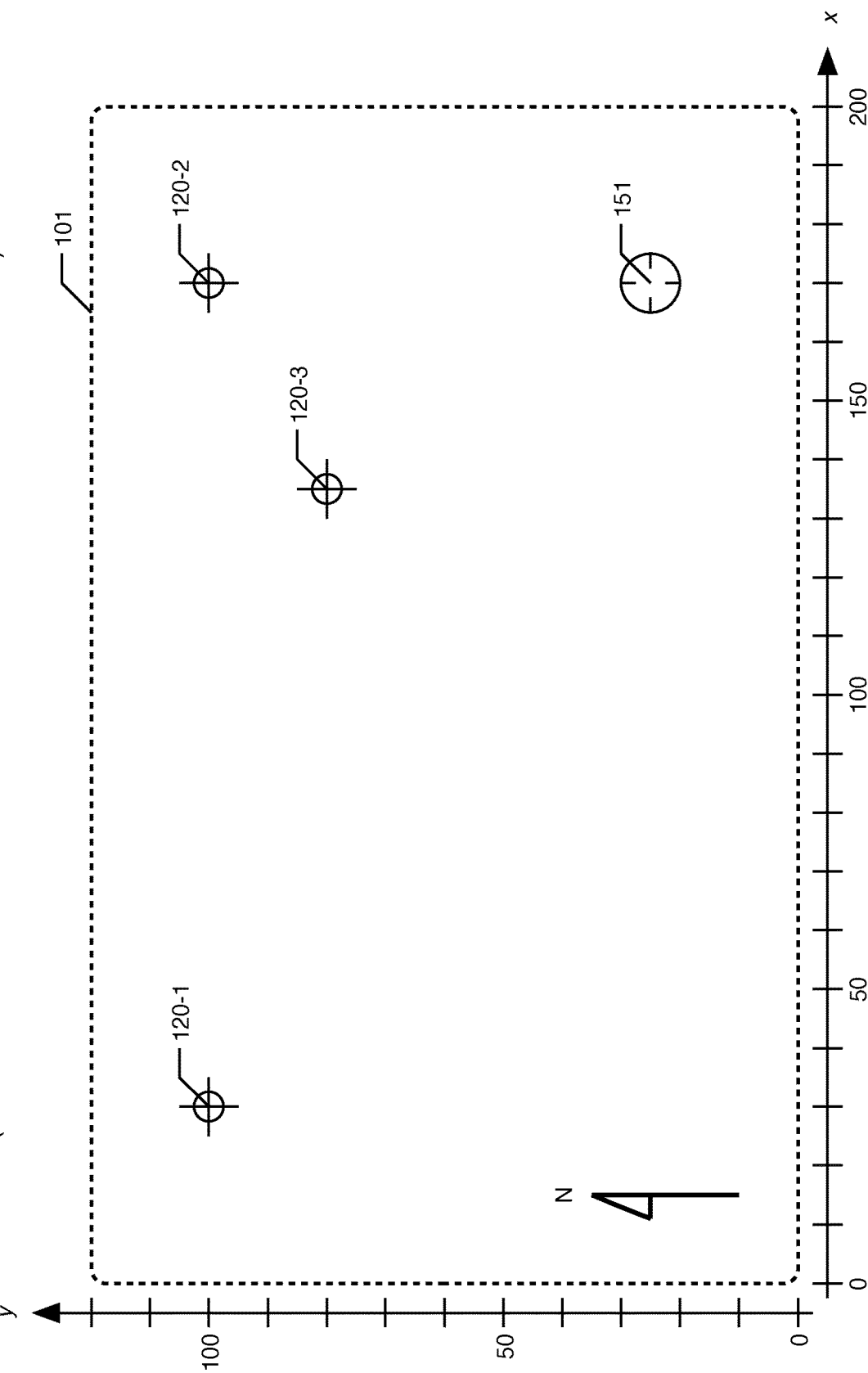
FIG. 8 depicts a map of geographic region 101 in accordance with the illustrative embodiment of the present invention, which map depicts the estimated location of reference radio 120-1, reference radio 120-2, and reference radio 120-3 (as estimated in task 604).

FIG. 8 depicts a map of geographic region 101 in accordance with the illustrative embodiment of the present invention, which map depicts the estimated location of reference radio 120-1, reference radio 120-2, and reference radio 120-3 (as estimated in task 604).

At task 605, location engine 151 generates the estimate of the transmission power of reference radio 120-3 by selecting the value of P(n) associated with the smallest value of C(n). Because the minimum value of C(2) is less than the minimum value of C(1), C(3), and C(4), location engine 151 decides that P(2) is more likely—based on the available empirical evidence—to be the best estimate of the transmission power of reference radio 120-3, and, therefore, location engine 151 estimates the transmission power of reference radio 120-3 to be P(2), which is 20 dBm.

Figure 9:
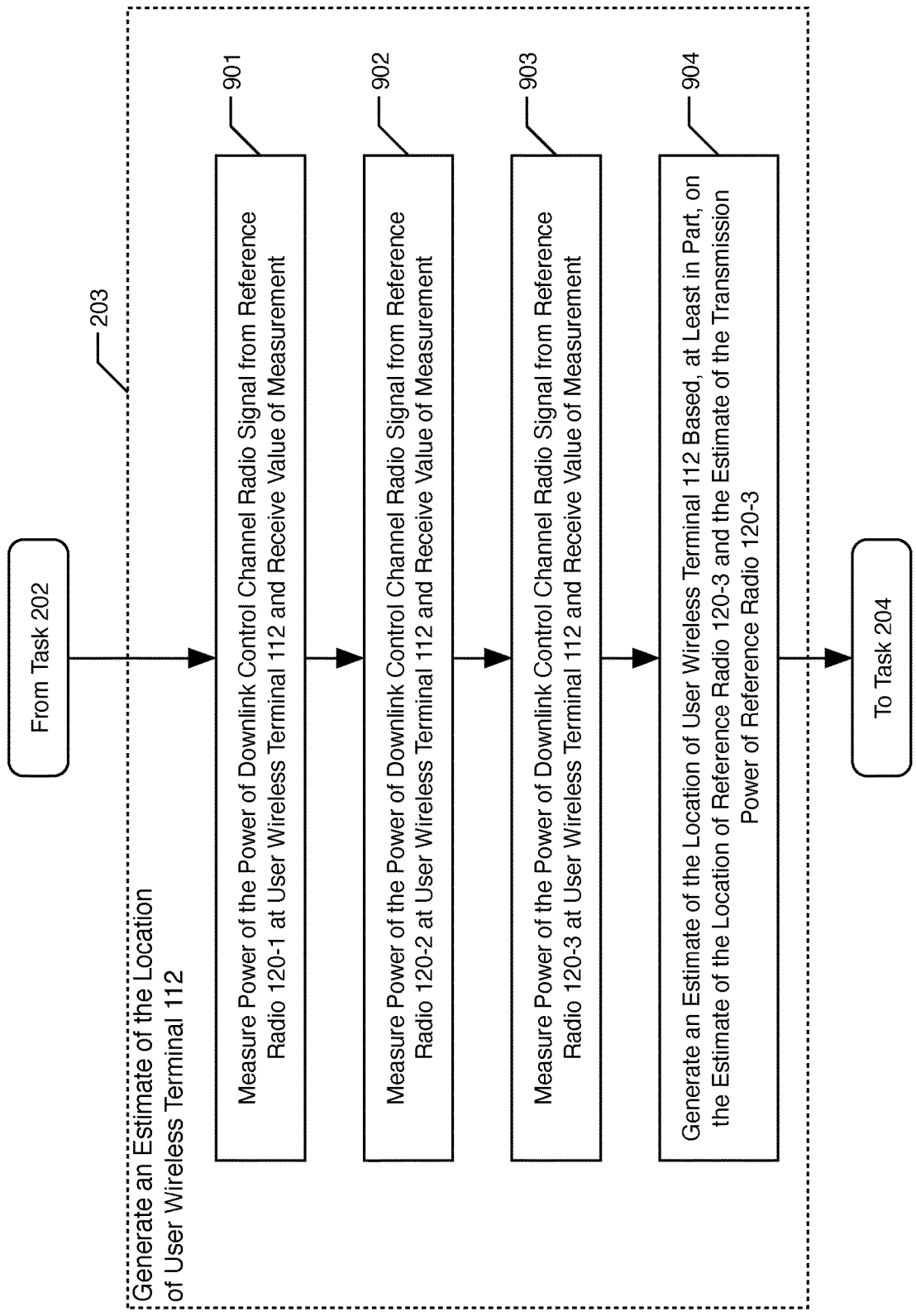
FIG. 9 depicts a flowchart of the subtasks performed in accordance with task 203—generating an estimate of the location of user wireless terminal 112.

FIG. 9 depicts a flowchart of the subtasks performed in accordance with task 203—generating an estimate of the location of user wireless terminal 112.

At task 901, user wireless terminal 112:
(i) measures the power of the 800 MHz downlink control channel radio signal that is transmitted by reference radio 120-1, and
(ii) transmits the value of the measurement to location engine 151.

As part of task 901, location engine 151 receives the measurement, which in accordance with the illustrative embodiment is −31 dBm.

At task 902, user wireless terminal 112 measures:
(i) measures the power of the 800 MHz downlink control channel radio signal that is transmitted by reference radio 120-2, and
(ii) transmits the value of the measurement to location engine 151.

As part of task 902, location engine 151 receives the measurement, which in accordance with the illustrative embodiment is −49 dBm.

At task 903, user wireless terminal 112 measures:
(i) measures the power of the 2.4 GHz downlink control channel radio signal that is transmitted by reference radio 120-3, and
(ii) transmits the value of the measurement to location engine 151.

As part of task 903, location engine 151 receives the power, which in accordance with the illustrative embodiment is −49 dBm.

At task 904, location engine 151 generates an estimate of the location of user wireless terminal 112 based on:
(i) the known location of reference radio 120-1, and
(ii) the known location of reference radio 120-2, and
(iii) the estimated location of reference radio 120-3, and
(iv) the known transmission power of reference radio 120-1, and
(v) the known transmission power of reference radio 120-2, and
(vi) the estimated transmission power of reference radio 120-3, and
(vii) the measurement by user wireless terminal 112 of the locally-averaged signal strength of the 800 MHz radio signal that is transmitted by reference radio 120-1, and
(viii) the measurement by user wireless terminal 112 of the locally-averaged signal strength of the 800 MHz radio signal that is transmitted by reference radio 120-2, and
(ix) the measurement by user wireless terminal 112 of the locally-averaged signal strength of the 2.4 GHz radio signal that is transmitted by reference radio 120-3.

It will be clear to those skilled in the art how to make and use embodiments of the present invention that perform task 904 using one or more techniques in the prior art (e.g., radio-signal pattern matching, radio-signal identification, etc.). In accordance with the illustrative embodiment, the location of user wireless terminal 112 is estimated to be at (125, 55, 1.5).

Figure 10:
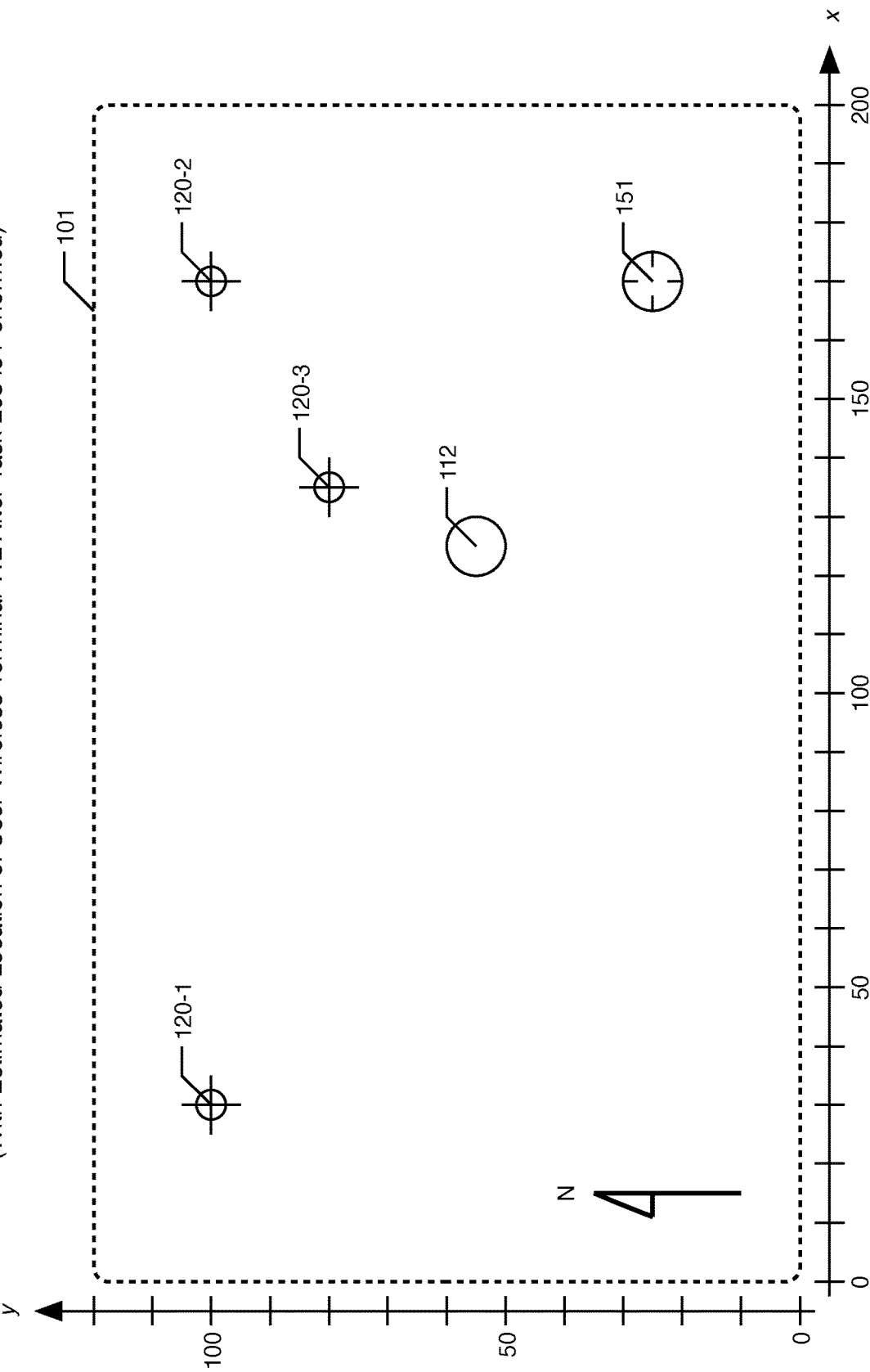
FIG. 10 depicts a map of geographic region 101 as known to location engine 151 after task 203 is performed.

FIG. 10 depicts a map of geographic region 101 as known to location engine 151 after task 203 is performed. The map in FIG. 10 depicts the location of reference radio 120-1, reference radio 120-2, reference radio 120-3 (as estimated in task 202), location engine 151, and user wireless terminal 112 (as estimated in task 904).

It will be clear to those skilled in the art, after reading this disclosure, how to make and use alternative embodiments of the present invention in which the number of candidate locations is treated as infinite. In such cases the index variable n in Equation 2 is recast in terms of the co-ordinates (x,y,z), and task 603 is approached as an optimization problem over a continuous space using a standard (iterative or heuristic) computational optimization technique (e.g., hill climbing with random restart, genetic algorithms, etc.). In these cases, the goal would be to find the values of (x,y,z) and P(x,y,z) that yield the lowest value of C(x,y,z) (within some margin of error $\partial$) for all m measurement values MV(m) as, for example and without limitation, in:

$$C(x,y,z)=\Sigma_{\forall m}(MV(m)-P(x,y,z)+A(x,y,z,m))^2 \qquad \text{(Eq. 3)}$$

In this case, the values of (x,y,z) that yield the lowest value of C(x,y,z) would be the best estimate of the location of the reference radio, and the associated value of P(x,y,z) would be the best estimate of the transmission power of the downlink control channel radio signal by the reference radio.

Furthermore, it will be clear to those skilled in the art, after reading this disclosure, how to make and use alternative embodiments of the present invention in which reference radio 120-3 transmits a plurality of downlink control channel radio signals at different frequencies (e.g., 2.4 GHz and 5.0 GHz, etc.). In these cases, the measurement values are of both signals, and equation 3 is optimized based on the measurement values of both signals and the candidate predictions of total path losses for both signals.

And still furthermore, it will be clear to those skilled in the art, after reading this disclosure, how to make and use alternative embodiments of the present invention in which there are two or more newly-discovered reference radios at different locations. In these cases, the measurement values are of both signals, and equation 6 is optimized based on the measurement values of both signals and the candidate predictions of total path losses for both signals.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
receiving:
(i) a first measurement value MV(1) of the locally-averaged signal strength of a radio signal as received at a first measurement location ML(1), wherein the radio signal is characterized by a wavelength $\lambda$, and
(ii) a second measurement value MV(2) of the locally-averaged signal strength of the radio signal as received at a second measurement location ML(2), wherein the first measurement location is not equal to the second measurement location;
generating:
(i) a first candidate location CL(1) of a radio transmitter of the radio signal, and
(ii) a second candidate location CL(2) of the radio transmitter of the radio signal, wherein the first candidate location is not equal to the second candidate location;
generating:
(i) a first candidate prediction of the total path loss A(1,1) for a hypothetical radio signal from the first candidate location CL(1) to the first measurement location ML(1), wherein the hypothetical radio signal is characterized by the wavelength $\lambda$, and

(ii) a second candidate prediction of the total path loss A(1,2) for the hypothetical radio signal from the first candidate location CL(1) to the second measurement location ML(2), and (iii) a third candidate prediction of the total path loss A(2,1) for the hypothetical radio signal from the second candidate location CL(2) to the first measurement location ML(1), and (iv) a fourth candidate prediction of the total path loss A(2,2) for the hypothetical radio signal from the second candidate location CL(2) to the second measurement location ML(2);

generating an estimate of the location of the radio transmitter of the radio signal based on which of:
(1) the first candidate location CL(1), and
(2) the second candidate location CL(2)

is more consistent with the first measurement value MV(1), the second measurement value MV(2), the first candidate prediction of the total path loss A(1,1), the second candidate prediction of the total path loss A(1,2), the third candidate prediction of the total path loss A(2,1), and the fourth candidate prediction of the total path loss A(2,2).

2. The method of claim 1 further comprising:
receiving a third measurement value that is evidence of the locally-averaged signal strength of the radio signal at a wireless terminal; and
generating an estimate of the location of the wireless terminal based on:
(i) the third measurement value, and
(ii) the estimate of the location of the radio transmitter of radio signal.

3. The method of claim 2 further comprising:
transmitting the estimate of the location of the wireless terminal to the wireless terminal for use in a location-based application.

4. The method of claim 2 further comprising:
transmitting the estimate of the location of the wireless terminal to a remote data processing system for use in a location-based application.

5. The method of claim 2 further comprising:
using the estimate of the location of the wireless terminal in a location-based application.

6. The method of claim 1 further comprising:
generating an estimate of the transmission power of the radio transmitter of the radio signal based on which of:
(1) the first candidate location CL(1), and
(2) the second candidate location CL(2)

is more consistent with the first measurement value MV(1), the second measurement value MV(2), the first candidate prediction of the total path loss A(1,1), the second candidate prediction of the total path loss A(1,2), the third candidate prediction of the total path loss A(2,1), and the fourth candidate prediction of the total path loss A(2,2).

7. The method of claim 6 further comprising:
receiving a third measurement value that is evidence of the locally-averaged signal strength of the radio signal at a wireless terminal; and
generating an estimate of the location of the wireless terminal based on:
(i) the third measurement value, and
(ii) the estimate of the location of the radio transmitter of the radio signal, and
(iii) an estimate of the transmission power of the radio transmitter of the radio signal.

8. The method of claim 1 further comprising:
generating an estimate of the excess path loss in a portion of a geographic region based on which of:
(1) the first candidate location, and
(2) the second candidate location is more consistent with the first measurement value MV(1), the second measurement value MV(2), the first candidate prediction of the total path loss A(1,1), the second candidate prediction of the total path loss A(1,2), the third candidate prediction of the total path loss A(2,1), and the fourth candidate prediction of the total path loss A(2,2).

9. The method of claim 8 further comprising:
receiving a third measurement value that is evidence of the locally-averaged signal strength of the radio signal at a wireless terminal; and
generating an estimate of the location of the wireless terminal based on:
(i) the third measurement value, and
(ii) the estimate of the location of the radio transmitter, and
(iii) the estimate of the excess path loss in the portion of the geographic region.

10. The method of claim 1 further comprising:
generating an estimate of the location of the footprint of a building based on which of:
(1) the first candidate location, and
(2) the second candidate location is more consistent with the first measurement value MV(1), the second measurement value MV(2), the first candidate prediction of the total path loss A(1,1), the second candidate prediction of the total path loss A(1,2), the third candidate prediction of the total path loss A(2,1), and the fourth candidate prediction of the total path loss A(2,2).

11. The method of claim 10 further comprising:
receiving a third measurement value that is evidence of the locally-averaged signal strength of the radio signal at a wireless terminal; and
generating an estimate of the location of the wireless terminal based on:
(i) the third measurement value, and
(ii) the estimate of the location of the radio transmitter, and
(iii) the estimate of the location of the footprint of the building.

12. The method of claim 1 further comprising:
generating an estimate of the location of an architectural feature of a building based on which of:
(1) the first candidate location, and
(2) the second candidate location is more consistent with the first measurement value MV(1), the second measurement value MV(2), the first candidate prediction of the total path loss A(1,1), the second candidate prediction of the total path loss A(1,2), the third candidate prediction of the total path loss A(2,1), and the fourth candidate prediction of the total path loss A(2,2).

13. The method of claim 12 further comprising:
receiving a third measurement value that is evidence of the locally-averaged signal strength of the radio signal at a wireless terminal; and
generating an estimate of the location of the wireless terminal based on:
(i) the third measurement value, and
(ii) the estimate of the location of the radio transmitter, and
(iii) the estimate of the location of the architectural feature of the building.

14. A method comprising:
receiving a plurality of measurement values of the locally-averaged signal strength of a radio signal as received at a plurality of measurement locations, wherein each of the plurality of measurement location is unique, and wherein the radio signal is characterized by a wavelength $\lambda$;
generating a plurality of candidate locations of a radio transmitter of the radio signal, wherein each of the plurality of candidate locations is unique;
generating a plurality of path loss estimates, wherein each of the plurality of path loss estimates is an estimate of the path loss for a hypothetical signal that propagates between a unique pair of:
 (i) one of the plurality of candidate locations, and
 (ii) one of the plurality of measurement locations,
wherein the hypothetical radio signal is characterized by the wavelength $\lambda$; and
generating an estimate of the location of the radio transmitter of the radio signal based on which of the plurality of candidate locations is most consistent with:
 (i) the plurality of measurement values, and
 (ii) the plurality of candidate predictions of total path loss.

15. The method of claim 14 further comprising:
receiving a measurement value that is evidence of the locally-averaged signal strength of the radio signal at a wireless terminal; and
generating an estimate of the location of the wireless terminal based on:
 (i) the measurement value of the radio signal at the wireless terminal, and
 (ii) the estimate of the location of the radio transmitter of the radio signal.

16. The method of claim 15 further comprising:
transmitting the estimate of the location of the wireless terminal to the wireless terminal for use in a location-based application.

17. The method of claim 15 further comprising:
transmitting the estimate of the location of the wireless terminal to a remote data processing system for use in a location-based application.

18. The method of claim 15 further comprising:
using the estimate of the location of the wireless terminal in a location-based application.

19. A method comprising:
receiving:
 (i) a first measurement value MV(1,1) of the power of a first radio signal as received at a first measurement location ML(1), wherein the first radio signal is transmitted by a radio transmitter and is characterized by a first wavelength $\lambda_1$, and
 (ii) a second measurement value MV(2,2) of the power of a second radio signal as received at a second measurement location ML(2), wherein the second radio signal is transmitted by the radio transmitter and is characterized by a second wavelength $\lambda_2$;
generating:
 (i) a first candidate location CL(1) of the radio transmitter, and
 (ii) a second candidate location CL(2) of the radio transmitter, wherein the first candidate location is not equal to the second candidate location;
generating:
 (i) a first candidate prediction of the total path loss A(1,1,1) for a first hypothetical radio signal from the first candidate location CL(1) to the first measurement location ML(1), wherein the first hypothetical radio signal is characterized by the wavelength $\lambda_1$, and
 (ii) a second candidate prediction of the total path loss A(2,2,2) for a second hypothetical radio signal from the second candidate location CL(2) to the second measurement location ML(2), wherein the second hypothetical radio signal is characterized by the wavelength $\lambda_2$, and
generating an estimate of the location of the radio transmitter based on which of:
 (1) the first candidate location CL(1), and
 (2) the second candidate location CL(2)
is more consistent with the first measurement value MV(1,1), the second measurement value MV(2,2), the first candidate prediction of the total path loss A(1,1,1), and the second candidate prediction of the total path loss A(2,2,2).

20. The method of claim 19 further comprising:
receiving a third measurement value that is evidence of the power of the first radio signal at a wireless terminal; and
generating an estimate of the location of the wireless terminal based on:
 (i) the third measurement value, and
 (ii) the estimate of the location of the radio transmitter.

21. The method of claim 20 further comprising:
transmitting the estimate of the location of the wireless terminal to the wireless terminal for use in a location-based application.

22. The method of claim 20 further comprising:
transmitting the estimate of the location of the wireless terminal to a remote data processing system for use in a location-based application.

23. The method of claim 20 further comprising:
using the estimate of the location of the wireless terminal in a location-based application.

24. The method of claim 20 further comprising:
generating an estimate of the excess path loss in a portion of a geographic region based on which of:
 (1) the first candidate location, and
 (2) the second candidate location
is more consistent with the first measurement value MV(1,1), the second measurement value MV(2,2), the first candidate prediction of the total path loss A(1,1,1), and the second candidate prediction of the total path loss A(2,2,2); and
receiving a third measurement value that is evidence of the power of the first radio signal at a wireless terminal; and
generating an estimate of the location of the wireless terminal based on:
 (i) the third measurement value, and
 (ii) the estimate of the location of the radio transmitter, and
 (iii) the estimate of the excess path loss in the portion of the geographic region.

25. The method of claim 20 further comprising:
generating an estimate of the location of the footprint of a building based on which of:
 (1) the first candidate location, and
 (2) the second candidate location
is more consistent with the first measurement value MV(1,1), the second measurement value MV(2,2), the first candidate prediction of the total path loss A(1,1,1), and the second candidate prediction of the total path loss A(2,2,2); and
receiving a third measurement value that is evidence of the power of the first radio signal at a wireless terminal; and generating an estimate of the location of the wireless terminal based on:
   (i) the third measurement value, and
   (ii) the estimate of the location of the radio transmitter, and
   (iii) the estimate of the location of the footprint of the building.

26. The method of claim 20 further comprising:
generating an estimate of the location of an architectural feature of a building based on which of:
   (1) the first candidate location, and
   (2) the second candidate location
is more consistent with the first measurement value MV(1,1), the second measurement value MV(2,2), the first candidate prediction of the total path loss A(1,1,1), and the second candidate prediction of the total path loss A(2,2,2); and
   receiving a third measurement value that is evidence of the power of the first radio signal at a wireless terminal; and
   generating an estimate of the location of the wireless terminal based on:
      (i) the third measurement value, and
      (ii) the estimate of the location of the radio transmitter, and
      (iii) the estimate of the location of the architectural feature of the building.

27. The method of claim 20 further comprising:
generating an estimate of the transmission power of the first radio signal based on which of:
   (1) the first candidate location, and
   (2) the second candidate location
is more consistent with the first measurement value MV(1,1), the second measurement value MV(2,2), the first candidate prediction of the total path loss A(1,1,1), and the second candidate prediction of the total path loss A(2,2,2); and
   receiving a third measurement value that is evidence of the power of the first radio signal at a wireless terminal; and
   generating an estimate of the location of the wireless terminal based on:
      (i) the third measurement value, and
      (ii) the estimate of the location of the radio transmitter, and
      (iii) the estimate of the transmission power of the first radio signal.

* * * * *